(12) United States Patent
Ianev et al.

(10) Patent No.: US 12,225,415 B2
(45) Date of Patent: Feb. 11, 2025

(54) ACCESS NETWORK NODE, USER EQUIPMENT, NETWORK FUNCTION NODE AND CONTROL METHOD

(71) Applicant: NEC Corporation, Tokyo (JP)

(72) Inventors: Iskren Ianev, Reading (GB); Toshiyuki Tamura, Tokyo (JP); Hassan Al-Kanani, Chinthurst (GB); Linghang Fan, Surrey (GB)

(73) Assignee: NEC CORPORATION, Tokyo (JP)

( * ) Notice: Subject to any disclaimer, the term of this patent is extended or adjusted under 35 U.S.C. 154(b) by 222 days.

(21) Appl. No.: 17/630,189

(22) PCT Filed: Jul. 20, 2021

(86) PCT No.: PCT/JP2021/027211
§ 371 (c)(1),
(2) Date: Jan. 26, 2022

(87) PCT Pub. No.: WO2022/030254
PCT Pub. Date: Feb. 10, 2022

(65) Prior Publication Data
US 2023/0362766 A1 Nov. 9, 2023

(30) Foreign Application Priority Data
Aug. 5, 2020 (EP) .................................. 20189550

(51) Int. Cl.
*H04W 36/00* (2009.01)
(52) U.S. Cl.
CPC ........ *H04W 36/0011* (2013.01); *H04W 36/13* (2023.05)

(58) Field of Classification Search
None
See application file for complete search history.

(56) References Cited

U.S. PATENT DOCUMENTS

| 2020/0120589 | A1* | 4/2020 | Velev ..................... H04W 76/25 |
| 2023/0052699 | A1 | 2/2023 | Ninglekhu et al. |

FOREIGN PATENT DOCUMENTS

| JP | 2018-157515 A | 10/2018 |
| JP | 2023-509692 A | 3/2023 |

OTHER PUBLICATIONS

International Search Report for PCT Application No. PCT/JP2021/027211, mailed on Feb. 4, 2022.

(Continued)

*Primary Examiner* — Minh Trang T Nguyen
(74) *Attorney, Agent, or Firm* — Sughrue Mion, PLLC

(57) ABSTRACT

An object of the present disclosure is to provide an access network node, a user equipment, a network function node and a control method capable of steering a UE in connected mode. In one example aspect, a control method for an access network node includes: receiving, from a network function node for mobility management, at least one first network slice information, each of which is different from a second network slice information being used for a Protocol Data Unit, PDU, session with a user equipment, UE; and performing a redirection procedure for the UE from a first cell to a second cell which supports one of the at least one first network slice information in a case where the second network slice information is not available in the first cell.

11 Claims, 11 Drawing Sheets

(56) References Cited

OTHER PUBLICATIONS

3GPP Technical Report (TR) 21.905:"Vocabulary for 3GPP Specifications" V17.0.0 (Jul. 2020). pp.1-66.
3GPP TS 23.501:"System architecture for the SG System (5GS)" V16.5.0 (Jul. 2020), pp. 1-441.
3GPP TS 23.502:"Procedures for the 5G System (5GS)" V16.5.0 (Jul. 2020), pp. 1-594.
GSM Association Official Document NG. 116—Generic Network Slice Template, v2.0, Oct. 16, 2019, pp. 1-61.
3GPP TR 23.700-40: "Study on enhancement of network slicing; Phase 2" V0.4.0 (Jun. 2020), pp. 1-143.
3GPP TS 38.300: "NR; NR and NG-RAN Overall Description; Stage-2" V16.2.0 (Jul. 2020), pp. 1-148.
3GPP TS 38.423: "NG-RAN; Xn Application Protocol (XnAP)" V16.2.0 (Jul. 2020). pp. 1-447.
R3-171143, Ericsson: "Slice re-mapping or removal during mobility". 3GPP Draft, Apr. 3, 2017, pp. 1-5.
S2-2004587, NEC: "KI#7 New Sol#X: Steering the UE to a network slice in a different frequency band", 3GPP Draft, Jun. 8, 2020, pp. 1-3.
S2-2003733, Apple: "KI#7, New Sol: AMF assistance to NG-RAN during PDU Session establishment procedure", 3GPP Draft, May 23, 2020, pp. 1-3.
Japanese Office Action for JP Application No. 2022-504019 mailed on Jan. 24, 2023 with English Translation.
Sharp, "PDU session establishment procedure for anchor reallocation of SSC mode 3 PDU session", 3GPP TSG CT WG1 #109, C1-181488, Mar. 2, 2018.
International Search Report of PCT Application No. PCT/JP2021/027211 mailed on Feb. 4, 2022.
Written opinion for PCT Application No. PCT/JP2021/027211 mailed on Feb. 4, 2022.
Samsung, "Clarification on PDU session establishment without S-NSSAI indication", 3GPP TSG-SA2 Meeting #138-E, SP-200613, Jul. 3, 2020.
Huawei et al., "TS 23.502: Procedures of application-influenced UP management and SSC handling", 3GPP TSG SA WG2 Meeting #120, S2-172007, Mar. 26, 2017, Busan, South Korea.
Huawei et al., "Supporting network slicing in roaming scenario", SA WG2 Meeting #116BIS, S2-165385, Sep. 3, 2016, Sanya, China, pp. 1-10.
JP Office Action for Japanese Patent Application No. 2023-111098, mailed on May 28, 2024 with English Translation.
NEC, "KI#7 New Sol#X: Steering the UE to a network slice in a different frequency band", 3GPP TSG SA WG2 #139e S2-2004587, Jun. 12, 2020.

* cited by examiner

ACCESS NETWORK NODE, USER EQUIPMENT, NETWORK FUNCTION NODE AND CONTROL METHOD

This application is a National Stage Entry of PCT/JP2021/027211 filed on Jul. 20, 2021, which claims priority from European Patent Application 20189550.5 filed on Aug. 5, 2020, the contents of all of which are incorporated herein by reference, in their entirety.

TECHNICAL FIELD

The present disclosure relates to an access network node, a user equipment, a network function node and a control method.

BACKGROUND ART

There have been developments with regard to mobile communications technology, as shown in Non Patent Literatures (NPLs) 1 to 7. For example, NPL 3 describes 3GPP Technical Specification (TS), especially for the 5G System.

CITATION LIST

Non Patent Literature

NPL 1: 3GPP Technical Report (TR) 21.905: "Vocabulary for 3GPP Specifications" V17.0.0 (2020-07)
NPL 2: 3GPP TS 23.501: "System architecture for the 5G System (5GS)" V16.5.0 (2020-07)
NPL 3: 3GPP TS 23.502: "Procedures for the 5G System (5GS)" V16.5.0 (2020-07)
NPL 4: GSM Association Official Document NG.116-Generic Network Slice Template, v2.0 https://www.gsma.com/newsroom/wp-content/uploads/NG.116-v2.0.pdf
NPL 5: 3GPP TR 23.700-40: "Study on enhancement of network slicing; Phase 2" V0.4.0 (2020-06)
NPL 6: 3GPP TS 38.300: "NR; NR and NG-RAN Overall Description; Stage-2" V16.2.0 (2020-07)
NPL 7: 3GPP TS 38.423: "NG-RAN; Xn Application Protocol (XnAP)" V16.2.0 (2020-07)

SUMMARY OF INVENTION

Technical Problem

Considering the situation shown above, an object of the present disclosure is to provide an access network node, a user equipment, a network function node and a control method capable of steering a UE in connected mode.

Solution to Problem

In a first example aspect, an access network node comprises: means for receiving, from a network function node for mobility management, at least one first network slice information, each of which is different from a second network slice information being used for a Protocol Data Unit, PDU, session with a user equipment, UE; and means for performing a redirection procedure for the UE from a first cell to a second cell which supports one of the at least one first network slice information in a case where the second network slice information is not available in the first cell.

In a second example aspect, a user equipment, UE, comprises: means for transmitting, to a network function node for mobility management via an access network node, at least one network slice information and second network slice information in a Protocol Data Unit, PDU, session establishment request or a service request message, wherein the second network slice information is used for a PDU session with the network function node for mobility management, each of the at least one first network slice information is different from the second network slice information, and a redirection procedure for the UE from a first cell served by the access network node to a second cell which supports one of the at least one first network slice information is performed in a case where the second network slice information is not available in the first cell.

In a third example aspect, a user equipment, UE, comprises: means for transmitting, to a network function node for mobility management via an access network node, an application identity and second network slice information in a Protocol Data Unit, PDU, session establishment request or a service request message, wherein the second network slice information is used for a PDU session with the network function node for mobility management, the application identity is used by the network function node for mobility management for retrieving at least one first network slice information, each of which is different from the second network slice information, and a redirection procedure for the UE from a first cell served by the access network node to a second cell which supports one of the at least one first network slice information is performed in a case where the second network slice information is not available in the first cell.

In a fourth example aspect, a network function node for mobility management comprises: means for sending, to an access network node, at least one first network slice information, each of which is different from a second network slice information being used for a PDU session with a user equipment, UE, wherein the at least one first network slice information is used, by the access network node, for performing a redirection procedure for the UE from a first cell to a second cell which supports one of the at least one first network slice information in a case where the second network slice information is not available in the first cell.

In a fifth example aspect, a control method for an access network node comprises: receiving, from a network function node for mobility management, at least one first network slice information, each of which is different from a second network slice information being used for a Protocol Data Unit, PDU, session with a user equipment, UE; and performing a redirection procedure for the UE from a first cell to a second cell which supports one of the at least one first network slice information in a case where the second network slice information is not available in the first cell.

In a sixth example aspect, a control method for a user equipment, UE, comprises: transmitting, to a network function node for mobility management via an access network node, at least one network slice information and second network slice information in a Protocol Data Unit, PDU, session establishment request or a service request message, wherein the second network slice information is used for a PDU session with the network function node for mobility management, each of the at least one first network slice information is different from the second network slice information, and a redirection procedure for the UE from a first cell served by the access network node to a second cell which supports one of the at least one first network slice information is performed in a case where the second network slice information is not available in the first cell.

In a seventh example aspect, a control method for a user equipment, UE, comprises: transmitting, to a network function node for mobility management via an access network node, an application identity and second network slice information in a Protocol Data Unit, PDU, session establishment request or a service request message, wherein the second network slice information is used for a PDU session with the network function node for mobility management, the application identity is used by the network function node for mobility management for retrieving at least one first network slice information, each of which is different from the second network slice information, and a redirection procedure for the UE from a first cell served by the access network node to a second cell which supports one of the at least one first network slice information is performed in a case where the second network slice information is not available in the first cell.

In an eighth example aspect, a control method for a network function node for mobility management, comprises: sending, to an access network node, at least one first network slice information, each of which is different from a second network slice information being used for a PDU session with a user equipment, UE, wherein the at least one first network slice information is used, by the access network node, for performing a redirection procedure for the UE from a first cell to a second cell which supports one of the at least one first network slice information in a case where the second network slice information is not available in the first cell.

Advantageous Effects of Invention

According to the present disclosure, it is possible to provide an access network node, a user equipment, a network function node and a control method capable of steering a UE in connected mode.

DESCRIPTION OF EMBODIMENTS

Figure 1:
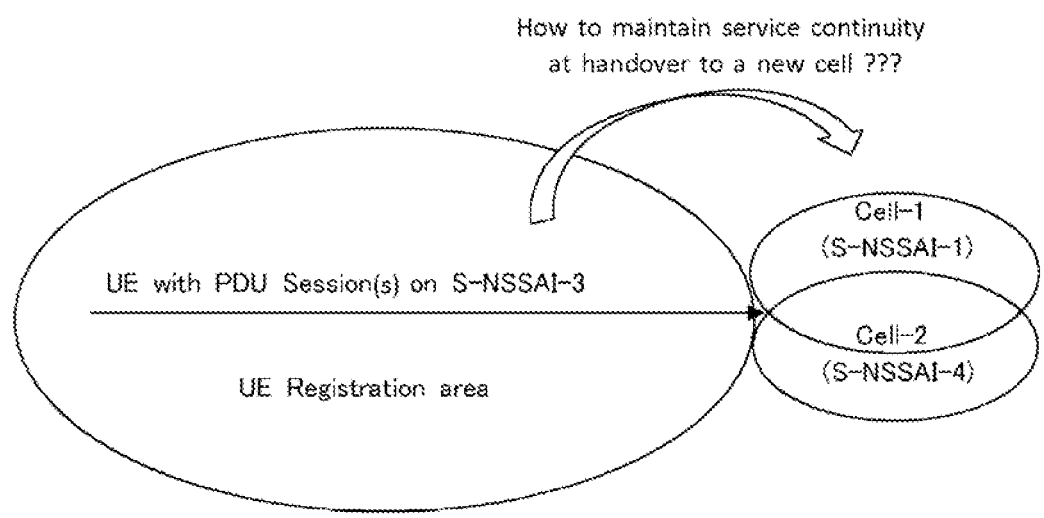
FIG. 1 is a figure illustrating a use case where active PDU Session(s) of the UE may be released at a handover according to a first example aspect.

Prior to explaining aspects according to this present disclosure, the following explanatory notes will be given.

Abbreviations

For the purposes of the present disclosure, the following abbreviations apply.
3GPP 3rd Generation Partnership Project
5G 5th Generation
5GC 5G Core Network
5GS 5G System
5G-AN 5G Access Network
AMF Access and Mobility Management Function
AS Application Server
CAG Closed Access Group
CDR Charging Data Record
CHF Charging Function
gNB Next Generation NodeB
GSMA Global System for Mobile Communications Association
NAS Non-Access Stratum
NG-RAN Next Generation Radio Access Network
NR New Radio
NSSAA Network Slice Specific Authentication and Authorisation
NSSAI Network Slice Selection Assistance Information
NSSP Network Slice Selection Policy
PCF Policy Control Function
PDU Protocol Data Unit
PLMN Public Land Mobile Network
RACH Random Access Channel
RAN Radio Access Network
RAT Radio Access Technology
RRC Radio Resource Control
S-AMF Source AMF
S-NSSAI Single Network Slice Selection Assistance Information
S-RAN Source RAN
SMF Session Management Function
TA Tracking Area
T-AMF Target AMF
T-RAN Target RAN
UDM Unified Data Management
UDR Unified Data Repository
UE User Equipment
URLLC Ultra Reliable and Low Latency Communications
URSP UE Route Selection Policy Definitions For the purposes of the present disclosure, the terms and definitions given in 3GPP Technical Report (TR) 21.905: "Vocabulary for 3GPP Specifications" V17.0.0 (2020-07) (hereinafter referred to 3GPP TR 21.905) and the following apply. A term defined in the present document takes precedence over the definition of the same term, if any, in 3GPP TR 21.905.

RELATED ARTS

The Network Slicing features defined in 3GPP release 15 and release 16 enable a great variety of communication services for the operators and the verticals alike. To enhance the commercial viability of the Network Slicing, GSMA 5GJA has introduced in GSM Association Official Document NG. 116-Generic Network Slice Template, v2.0, from which several Network Slice Types descriptions can be derived. Some of the parameters in the Generic Slice Template (GST) point explicitly to the definition of parameters and bounds on the service delivered to the end customer. However, the enforcement of some of these bounds and parameters are not supported by the 5GS yet.

The SA2 Study on Enhancement of Network Slicing Phase 2 aims at identifying the gaps that need to be filled in providing the support for the GST parameters enforcement and the suitable solutions to address these gaps.

RAN follows the progress of SA2 study on enhanced Network Slicing and RAN has agreed their own study item on RAN slicing enhancement. The aim is to investigate enhancements on RAN support of the network slicing with the following objectives:

1. Study mechanisms to enable UE fast access to the cell supporting the intended slice, including
   a. Slice based cell reselection under network control
   b. Slice based RACH configuration or access barring
   Note: whether the existing mechanism can meet this scenario or requirement can be studied.
2. Study necessity and mechanisms to support service continuity, including a. For intra-RAT handover service interruption, e.g., target gNB doesn't support the UE's ongoing slice, study slice re-mapping, fall-back, and data forwarding procedures. Coordination with SA2 is needed.

FIG. 1 illustrates a use case where active PDU Session(s) of the UE may be released at a handover if a target cell does not support the network slice with the active PDU Session(s) on the network slice in the UE. The following use case is considered:

The UE is registered on the S-NSSAI-1, S-NSSAI-2, S-NSSAI-3 and S-NSSAI-4 and the UE is in connected mode, i.e., with active PDU Session(s) on the S-NSSAI-3.

The S-NSSAI-3 is not homogeneously supported in the whole PLMN (as per the current agreements in the 3GPP specifications).

The UE is moving towards the edges of the current registration area into the coverage of the Cell-1 supporting the S-NSSAI-1 and of the Cell-2 supporting the S-NSSAI-4.

Both cells, the Cell-1 and the Cell-2, are eligible for a target cell in a handover.

Problem: Based on the related art, the PDU Session(s) on the S-NSSAI-3 will be released at a handover to one of the target cells Cell-1 or Cell-2 as they do not support the network slice S-NSSAI-3 on which the UE has the active PDU Session(s), as shown in FIG. 1. One of the problems for this disclosure is how to steer the UE in connected mode (e.g., handover) to a target cell in order to support the service continuity when the network slice with active PDU Session(s) on the network slice (e.g., S-NSSAI-3) is not supported by the target cells.

DESCRIPTION OF ASPECTS

This disclosure describes multiple aspects and variants for each instance. These aspects and variants can be arbitrarily combined with each other.

The present disclosure relates to a communication system. The disclosure has particular but not exclusive relevance to wireless communication systems and devices thereof operating according to the 3rd Generation Partnership Project (3GPP) standards or equivalents or derivatives thereof. The disclosure has particular although not exclusive relevance to network slices and handover in the so-called '5G' (or 'Next Generation') systems.

From another point of view, this disclosure proposes alternative network slices provision by a UE or a network for service continuity assistance in a handover. It proposes methods for a PDU Session transfer to an alternative network slice at a handover when a current network slice with an active PDU Session on the current network slice is not supported by a target cell. This allows for an improved service continuity when the network slice with an active PDU Session is not supported or not allowed in the target cell.

First Example Aspect

A first example aspect of the disclosure is explained below referring to the accompanying drawings. The following detailed description is merely exemplary in nature and is not intended to limit this disclosure or the application and uses of this disclosure. Furthermore, there is no intention to be bound by any theory presented in the preceding background of this disclosure or the following detailed description.

(Solution 1—UE Assistance with Alternative Network Slice for PDU Session Continuity)

Solution 1 proposes PDU Session(s) transfer to an alternative network slice at a handover when the current network slice with active PDU Session(s) on the current network slice is not supported by the target cells. This allows for improved service continuity by transferring the active PDU Session(s) on the current network slice to an alternative network slice thus maintaining the service continuity, instead releasing the PDU Session(s). In this solution, the alternative network slices, for the PDU Session that is being established, are provided by the UE as a new parameter in the PDU Session Establishment Request message or Service Request message and then the AMF further provides these alternative network slices to the RAN node to assist a potential Xn and N2 handover.

Figure 2:
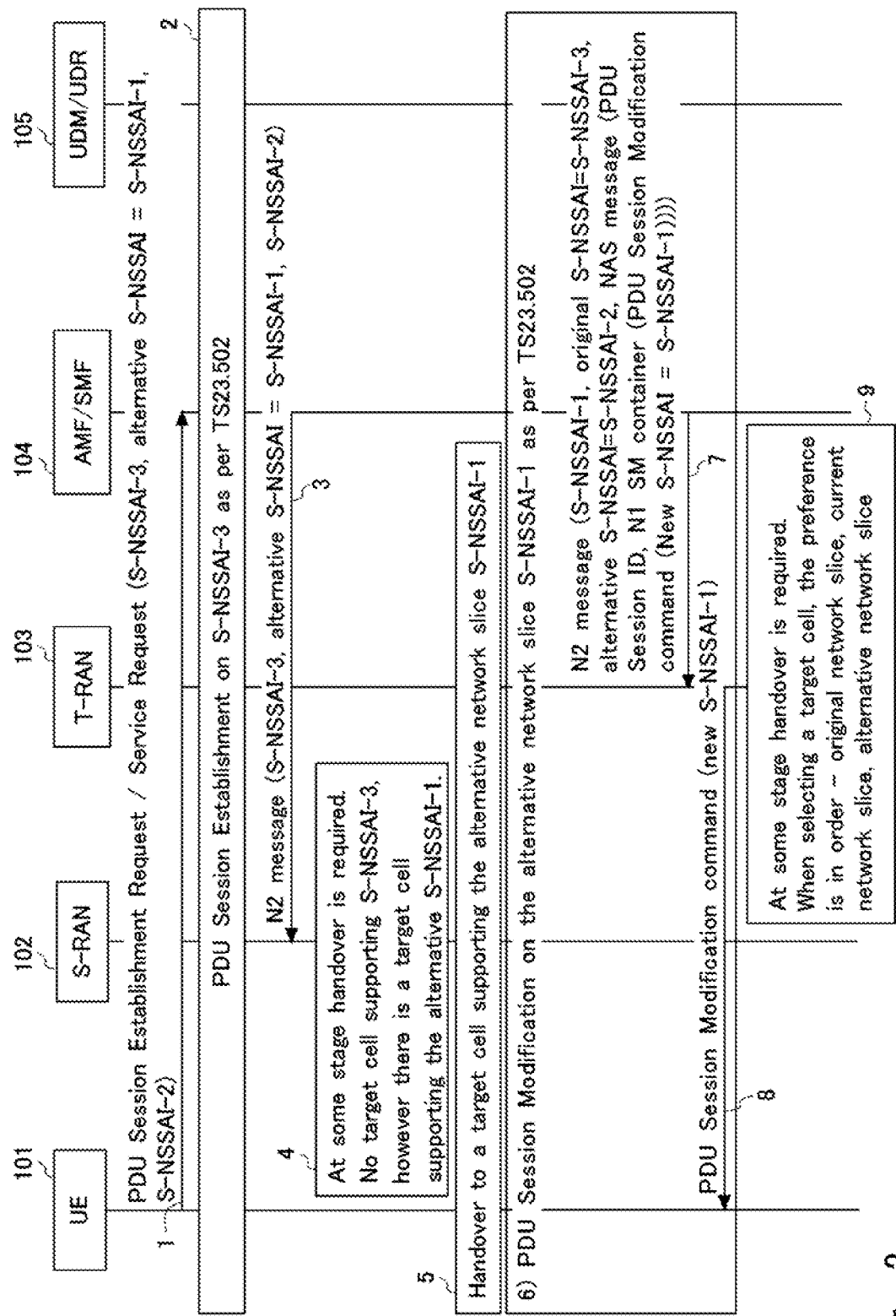
FIG. 2 is a schematic timing (signalling) diagram illustrating an exemplary method for UE assistance according to the first example aspect.

FIG. 2 is a schematic timing (signalling) diagram illustrating an exemplary method for UE assistance with alternative network slice(s) for PDU Session(s) continuity in the Xn handover.

1) PDU Session Establishment Request/Service Request (S-NSSAI-3, alternative S-NSSAI=S-NSSAI-1, S-NSSAI-2)—An Application in the UE 101 requires a service. The UE 101 checks with the NSSP (Network Slice Selection Policy) within the URSP (UE Route Selection Policy) rules in the UE Policy and finds out the network slice(s) on which the Application can receive a service, e.g., the S-NSSAI-3, S-NSSAI-1 and S-NSSAI-2. The UE 101 is registered to all these network slices. Based on the request from the Application, the UE 101 sends, to the AMF 104, a PDU Session Establishment Request message or a Service Request message on the network slice S-NSSAI-3, for example. Along with the network slice S-NSSAI-3 inclusion in the PDU Session Establishment Request message or in the Service Request message (on which the PDU Session is to be established or reactivated), the UE 101 also includes in the PDU Session Establishment Request message or in the Service Request message a new parameter 'alternative S-NSSAI' in which the UE 101 places the network slice(s), other than the S-NSSAI-3, that are also compatible with the service requiring Application in the UE 101, e.g. S-NSSAI-1 and S-NSSAI-2, if any.

The new parameter may be structured with priority order or preference order among alternative S-NSSAI(s). For example, if the "alternative S-NSSAI" parameter is set as the alternative S-NSSAI=S-NSSAI-1, S-NSSAI-2, this means that the UE 101 wishes to use the S-NSSAI-1 as an alternative S-NSSAI for the S-NSSAI-3 rather than the S-NSSAI-2. This new parameter may be called 'alternative S-NSSAI', 'alternative network slice', 'backup network slice', 'backup S-NSSAI' or any other name or notation for a parameter with the purpose to carry information for the network slice(s) that the service requiring Application in the UE 101 can work with based on the NSSP/URSP rules in the UE 101. The 'alternative network slice' can also be the default allowed S-NSSAI in the UE 101, if available. The 'alternative network slice(s)' can also be delivered by the UE 101 to the network via any other NAS message.

In one example, the AMF 104 may obtain alternative S-NSSAI(s) per S-NSSAI in the subscribed NSSAI during the Registration Procedure or during the Subscriber Data Update Notification to AMF procedure as described in 3GPP Technical Specification (TS) 3GPP TS 23.502: "Procedures for the 5G System (5GS)" V16.5.0 (2020-07) (hereinafter referred to 3GPP TS 23.502). In this case, the Nudm_SDM_Get service is used during the Registration Procedure and the Nudm_SDM_Notification service is used during the Subscriber Data Update Notification to AMF procedure.

In another example, the SMF 104 may obtain alternative S-NSSAI(s) per S-NSSAI in the subscribed NSSAI during the Registration Procedure or during the Subscriber Data Update Notification to SMF 104 procedure as described in 3GPP TS 23.502. In this case, the Nudm_SDM_Get service is used during the Registration Procedure and Nudm_SDM_Notification service is used during the Subscriber Data Update Notification to SMF procedure.

2) PDU Session Establishment on the S-NSSAI-3 as per 3GPP TS 23.502.

3) N2 message (S-NSSAI-3, alternative S-NSSAI=S-NSSAI-1, S-NSSAI-2)—At the end of the PDU Session Establishment procedure on the network slice S-NSSAI-3, the AMF 104 sends, to the Source RAN (S-RAN) node 102, the N2 message (or in any other message on the N2 interface between the AMF 104 and the RAN node), including a parameter for the current network slice on which the PDU Session was established (e.g. S-NSSAI-3), and also including the alternative network slice(s), if any, for example S-NSSAI-1 and S-NSSAI-2 within a new 'alternative S-NSSAI' parameter.

The new parameter may be structured with priority order or preference order among the alternative S-NSSAI(s). This new parameter in the N2 message may be called 'alternative S-NSSAI', 'alternative network slice', 'backup network slice', 'backup S-NSSAI' or any other name or notation for a parameter with the purpose to carry information for the network slice(s) that the service requiring Application in the UE 101 can work with. The alternative network slices S-NSSAI-1 and S-NSSAI-2, which the AMF 104 includes in the 'alternative S-NSSAI' parameter in the N2 message, are the ones which the AMF 104 has received from the UE 101 in the PDU Session Establishment Request message or in the Service Request message. The 'alternative network slice' can also be the default allowed S-NSSAI in the AMF 104 or UDM/UDR 105, if available. When the AMF 104 sends the N2 message including alternative S-NSSAI(s) to the S-RAN node 102, the AMF 104 may confirm that the SMF(s) 104 associated to the PDU session(s) are accessible from any alternative S-NSSAIs.

4) At some stage a handover is required. There is no target cell supporting the S-NSSAI-3 on which the UE 101 has an active PDU Session. However, there is a target cell supporting an alternative network slice, e.g., alternative S-NSSAI=S-NSSAI-1.

5) Handover to a target cell supporting the alternative network slice S-NSSAI-1. The S-RAN node 102 selects a target cell that supports one of the alternative network slices, e.g., alternative network slice S-NSSAI-1. If only the alternative network slice S-NSSAI-1 or the alternative network slice S-NSSAI-2 is available at any of the target cells, the priority among the alternative network slices should be considered at the S-RAN node 102 when selecting a target cell. If both alternative network slice S-NSSAI-1 and the alternative network slice S-NSSAI-2 are available at a target cell, the S-RAN node 102 selects the alternative network slice S-NSSAI-1 taking the priority into account.

6) PDU Session Modification on the alternative network slice S-NSSAI-1 as per 3GPP TS 23.502—The AMF 104 triggers the PDU Session Modification procedure to replace the current S-NSSAI, i.e., S-NSSAI-3, with the alternative network slice S-NSSAI-1. As the S-NSSAI will be swapped during this procedure, the SMF 104 may contact the PCF and/or the CHF (Charging Function) to issue separate CDRs, one with the original S-NSSAI-3 and the other one with the alternative network slice S-NSSAI-1.

7) During the PDU Session Modification procedure, when the AMF 104 sends the N2 message to the T-RAN node 103, the N2 message contains the following parameters.

N2 message (S-NSSAI-1, original S-NSSAI=S-NSSAI-3, alternative S-NSSAI=S-NSSAI-2, NAS message (PDU Session ID, N1 SM container (PDU Session Modification command (New S-NSSAI=S-NSSAI-1))))—During the PDU Session Modification procedure for replacing the network slice S-NSSAI-1, the AMF 104 may send the N2 message to the target RAN (T-RAN) node 103. Along with the network slice on which the PDU Session(s) were established, the AMF 104 also includes in the N2 message (or in any other message on the N2 interface between the AMF 104 and the RAN node) two new parameters:

- Original S-NSSAI—The AMF 104 places in this parameter the initial network slice from which the PDU Session was transferred to one of the alternative network slices in the last handover, e.g., S-NSSAI-3. This new parameter may be called 'original S-NSSAI', 'original network slice', 'initial network slice', 'initial S-NSSAI', 'UE requested S-NSSAI' or any other name or notation for a parameter with the purpose to carry information for the network slice(s) on which the PDU Session was established at the PDU Session Establishment procedure as described in 3GPP TS 23.502.
- Alternative S-NSSAI—The AMF 104 places in this parameter one of the remaining alternative network slices received with the PDU Session Establishment Request message or Service Request message from the UE 101, e.g., S-NSSAI-2. The alternative network slice can also be the default allowed S-NSSAI in the AMF 104 or UDM/UDR 105, if available.

The alternative S-NSSAI may also indicate alternative network slices that will be used for the PDU Session after the successful Handover procedure.

8) During the PDU Session Modification procedure, when the SMF 104 sends the PDU Session Modification command to the UE 101 via the AMF 104 (within the N2 message on the AMF 104 to the T-RAN node interface) and the T-RAN node 103, the PDU Session Modification command includes a New S-NSSAI parameter (e.g., S-NSSAI-1) in order to let the UE 101 know that the S-NSSAI (e.g. S-NSSAI-3) being used for the PDU Session has been replaced with the New S-NSSAI (e.g. S-NSSAI-1). The T-RAN node 103 sends the PDU Session Modification command, received from the SMF 104 via the AMF 104 (within the N2 message on the AMF 104 to the T-RAN node interface), to the UE 101. With this information, the UE 101 updates the network slice state in the UE 101.

In one example, instead of sending the PDU Session Modification message to the UE 101, the AMF 104 may send the UE Configuration Update message to the UE 101 via the T-RAN node 103 to let the UE 101 know that the S-NSSAI (e.g., S-NSSAI-3) being used for the PDU Session has been replaced with the New S-NSSAI (e.g., S-NSSAI-1).

9) At some stage later again, a handover is required. When selecting a target cell and there are multiple qualifying cells supporting different network slice(s), the T-RAN node 103 may select the target cell in the following order of preference:

The 'original S-NSSAI'—the T-RAN node 103 may give preference to the original network slice first (e.g., S-NSSAI-3) in selecting a target cell. This would allow for the PDU Session to be transferred back to the network slice on which the PDU Session has been established at the very beginning as this network slice may be the most suitable network slice for the PDU Session(s), e.g., S-NSSAI-3;

The current network slice-if no target cell supports the original network slice (e.g., S-NSSAI-3), then the T-RAN node 103 may prefer to select a target cell supporting the current network slice on which the PDU Session is currently active, e.g., S-NSSAI-1.

The 'alternative S-NSSAI'-If there is no target cell supporting the original network slice (e.g., S-NSSAI-3) nor the current network slice (e.g., S-NSSAI-1), then the T-RAN node 103 may prefer a target cell supporting the alternative network slice if available, e.g., S-NSSAI-2.

It should be noted that the (source/target) RAN node may apply an alternative order(s) in selecting the target cell for example, first giving priority to a target cell supporting the current network slice with active PDU Session on it (e.g., S-NSSAI-1) and then the original S-NSSAI (e.g., S-NSSAI-3) if available and last the alternative S-NSSAI (e.g., S-NSSAI-2) if available. The (source/target) RAN node may apply a preference in any other order, e.g., an operator defined or configured order of preference between the original network slice, the current network slice and the alternative network slice.

Although the FIG. 2 illustrates the Solution about the UE 101 assistance with alternative network slice for PDU Session continuity during the handover, it should also be noted that the step 6, including step 7 and step 8, can be solely used for the following cases in order to swap the S-NSSAI on active PDU session(s) without releasing the PDU sessions(s):

Slice congestion detected by the AMF/SMF 104 or via the NWDAF (Network Data Analytics Function).

When the network slice indicated by an S-NSSAI that is used for active PDU session(s) gets congested, the AMF/SMF 104 may initiate the step 6 to swap the S-NSSAI being used for the PDU session(s) to another S-NSSAI by indicating less-congested network slice(s). This operation allows the AMF/SMF 104 to reduce traffics on congested network slice(s).

An S-NSSAI withdrawal from the subscriber data.

When an S-NSSAI associated to the active PDU session(s) is withdrawn from the subscriber data in the UDM 105, this subscriber data update is reported to the AMF 104. In this case, the AMF 104 may initiate the step 6, rather than releasing the associated PDU session(s), to swap the S-NSSAI being withdrawn in the subscriber data to another S-NSSAI. This operation allows the AMF/SMF 104 to provide a better service experience since an active PDU session may survive.

Network Slice Specific authentication and authorization failure.

When the Network Slice Specific (re-)authentication and (re-)authorization to an S-NSSAI associated to the active PDU session(s) fails, the AMF 104 may initiate the step 6, rather than releasing the associated PDU session(s), to swap the S-NSSAI that failed for Network Slice Specific Authentication and Authorization to another S-NSSAI. This operation allows the AMF/SMF 104 to provide a better service experience since an active PDU session may survive.

Network Slice Specific Authentication and Authorization revocation.

When the Network Slice Specific (re-)authentication and (re-)authorization to an S-NSSAI associated to the active PDU session(s) is revoked, the AMF 104 may initiate the step 6, rather than releasing the associated PDU session(s), to swap the S-NSSAI that has been revoked for Network Slice Specific Authentication and Authorization to another S-NSSAI. This operation allows the AMF/SMF 104 to provide a better service experience since an active PDU session may survive.

It should also be noted that this alternative can be applied to the other use cases/solutions in the present disclosure.

Figure 3:
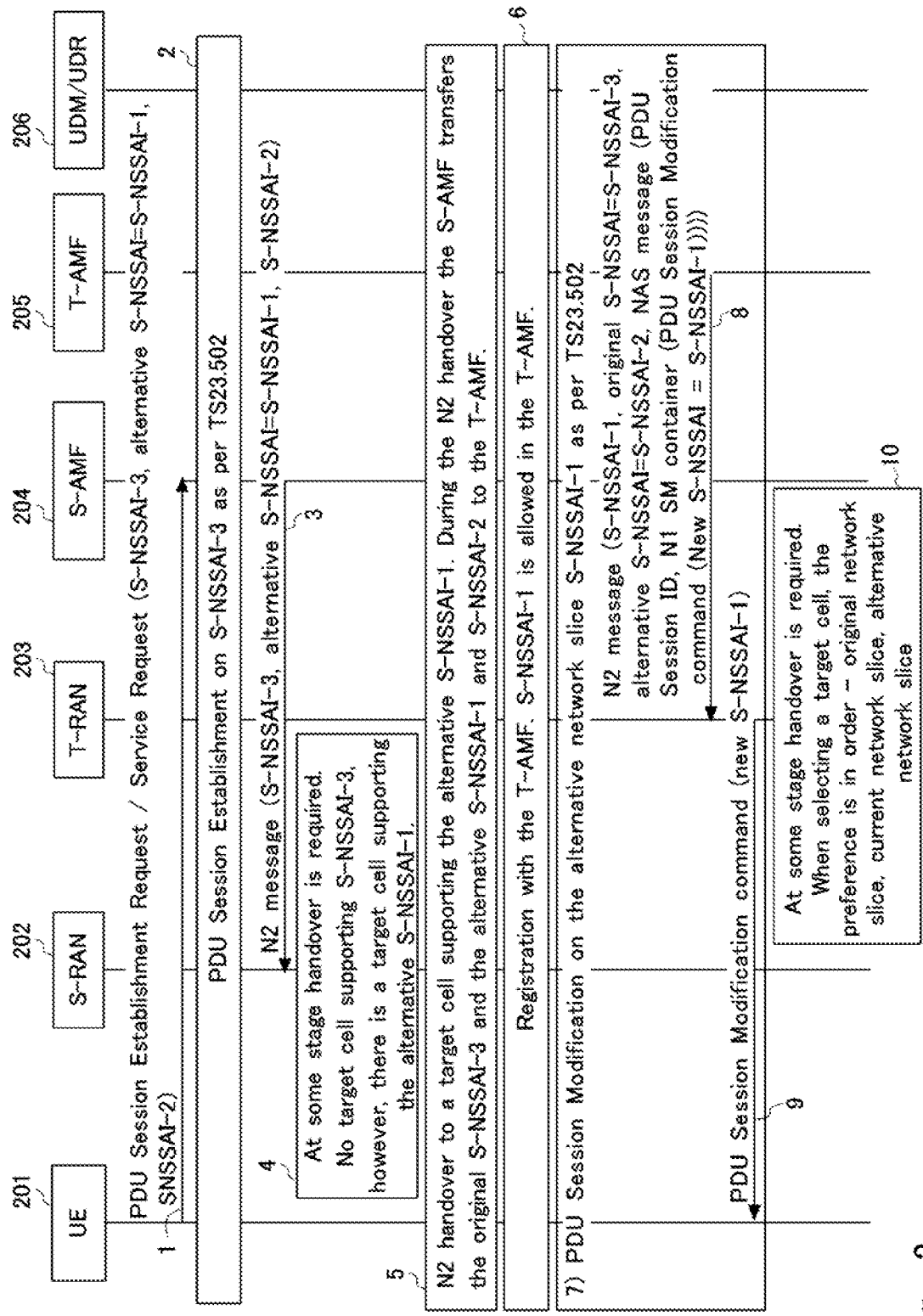
FIG. 3 is a schematic timing (signalling) diagram illustrating an exemplary method for UE assistance according to the first example aspect.

FIG. 3 is a schematic timing (signalling) diagram illustrating an exemplary method for UE assistance with alternative network slice(s) for PDU Session continuity in the N2 handover (Use case 1). In Use case 1 the alternative network slice in the target cell is re-confirmed as allowed network slice during the registration procedure in the target AMF (T-AMF) after the N2 handover.

1) PDU Session Establishment Request/Service Request (S-NSSAI-3, alternative S-NSSAI=S-NSSAI-1, S-NSSAI-2)—An Application in the UE 201 requires a service. The UE 201 checks with the NSSP (Network Slice Selection Policy) within the URSP (UE Route Selection Policy) rules in the UE Policy and finds out the network slice(s) on which the Application can receive a service, e.g., the S-NSSAI-3, S-NSSAI-1 and S-NSSAI-2. The UE 201 is registered to all these network slices. Based on the request from the Application, the UE 201 sends, to the source AMF (S-AMF) 204, a PDU Session Establishment Request message or Service Request message on the network slice S-NSSAI-3, for example. Along with the network slice S-NSSAI-3 inclusion in the PDU Session Establishment Request message or in the Service Request message (on which the PDU Session is to be established or reactivated), the UE 201 also includes in the PDU Session Establishment Request message or in the Service Request message a new parameter 'alternative S-NSSAI' in which the UE 201 places the network slice(s) that are also compatible with the service requiring Application in the UE 201, e.g., S-NSSAI-1 and S-NSSAI-2, if any.

The new parameter may be structured with priority order or preference order among alternative S-NSSAI(s). For example, if the "alternative S-NSSAI" parameter is set as the alternative S-NSSAI=S-NSSAI-1, S-NSSAI-2, this means that the UE 201 wishes to use the S-NSSAI-1 as an alternative S-NSSAI for the S-NSSAI-3 rather than the S-NSSAI-2. This new parameter may be called 'alternative S-NSSAI', 'alternative network slice', 'backup network slice', 'backup S-NSSAI' or any other name or notation for a parameter with the purpose to carry information for the network slice(s) that the service requiring Application in the UE 201 can work with based on the NSSP/URSP rules of the UE 201. The 'alternative network slice' can also be the default allowed S-NSSAI in the UE 201, if available. The 'alternative network slice(s)' can also be delivered by the UE 201 to the network via any other NAS message.

In one example, the AMF 204 may obtain alternative S-NSSAI(s) per S-NSSAI in the subscribed NSSAI during the Registration Procedure or during the Subscriber Data Update Notification to AMF procedure as described in 3GPP TS 23.502. In this case, the Nudm_SDM_Get service is used during the Registration Procedure and Nudm_SDM_Notification service is used during the Subscriber Data Update Notification to AMF procedure.

In another example, the SMF may obtain alternative S-NSSAI(s) per S-NSSAI in the subscribed NSSAI during the Registration Procedure or during the Subscriber Data Update Notification to SMF procedure as described in 3GPP TS 23.502. In this case, the Nudm_SDM_Get service is used during the Registration Procedure and the Nudm_SDM_Notification service is used during the Subscriber Data Update Notification to AMF procedure.

2) PDU Session Establishment on the S-NSSAI-3 as per 3GPP TS 23.502.

3) N2 message (S-NSSAI-3, alternative S-NSSAI=S-NSSAI-1, S-NSSAI-2)—At the end of the PDU Session Establishment procedure on the network slice S-NSSAI-3, the Source AMF (S-AMF) 204 sends, to the S-RAN node 202, the N2 message (or in any other message on the N2 interface between the S-AMF 204 and the S-RAN node 202), including a parameter for the current network slice on which the PDU Session was established (e.g. S-NSSAI-3), and also including the alternative network slice(s), if any, for example S-NSSAI-1 and S-NSSAI-2 within a new 'alternative S-NSSAI' parameter.

The new parameter may be structured with priority order or preference order among the alternative S-NSSAI(s). This new parameter in the N2 message may be called 'alternative S-NSSAI', 'alternative network slice', 'backup network slice', 'backup S-NSSAI' or any other name or notation for a parameter with the purpose to carry information for the network slice(s) that the service requiring Application in the UE 201 can work with. The alternative network slices S-NSSAI-1 and S-NSSAI-2, which the S-AMF 204 includes in the 'alternative S-NSSAI' parameter in the N2 message, are the ones which the S-AMF 204 has received from the UE 201 in the PDU Session Establishment Request message or in the Service Request message. The 'alternative network slice' can also be the default allowed S-NSSAI in the S-AMF 204 or UDM/UDR 206, if available.

When the S-AMF 204 sends the N2 message including alternative S-NSSAI(s) to the S-RAN node 202, the S-AMF 204 may confirm that the SMF(s) associated to the PDU session(s) are accessible from any alternative S-NSSAIs.

4) At some stage a handover is required. There is no target cell supporting the S-NSSAI-3 on which the UE 201 has an active PDU Session. However, there is a target cell supporting an alternative network slice, e.g., alternative S-NSSAI=S-NSSAI-1.

5) Handover to a target cell supporting the alternative network slice S-NSSAI-1. The S-RAN node 202 selects a target cell that supports one of the alternative network slices, e.g., alternative network slice S-NSSAI-1. If only the alternative network slice S-NSSAI-1 or the alternative network slice S-NSSAI-2 is available at any of the target cells, the priority among the alternative network slices should be considered at the S-RAN node 202 when selecting a target cell. If both alternative network slice S-NSSAI-1 and the alternative network slice S-NSSAI-2 are available at a target cell, the S-RAN node 202 selects the alternative network slice S-NSSAI-1 taking the priority into account. During the N2 handover the S-AMF 204 transfers the original S-NSSAI-3 and the alternative S-NSSAI-1 and S-NSSAI-2 to the T-AMF 205.

6) Registration with the T-AMF 205 as per 3GPP TS 23.502. The registration procedure re-confirms the S-NSSAI-1 as an allowed network slice.

7) PDU Session Modification on the alternative network slice S-NSSAI-1 as per 3GPP TS 23.502—The T-AMF 205 triggers the PDU Session Modification procedure to replace the current S-NSSAI, i.e., S-NSSAI-3, with the alternative network slice S-NSSAI-1.

As the S-NSSAI will be swapped during this procedure, the SMF may contact the PCF and/or the CHF to issue separate CDRs, one with the original S-NSSAI-3 and the other one with the alternative network slice S-NSSAI-1.

8) During the PDU Session Modification procedure, when the T-AMF 205 sends the N2 message to the T-RAN node 203, the N2 message contains the following parameters.

N2 message (S-NSSAI-1, original S-NSSAI=S-NSSAI-3, alternative S-NSSAI=S-NSSAI-2, NAS message (PDU Session ID, N1 SM container (PDU Session Modification command (New S-NSSAI=S-NSSAI-1)))) During the PDU Session Modification on the alternative network slice S-NSSAI-1, the T-AMF 205 may send the N2 message to the T-RAN node 203. Along with the network slice on which the PDU Session(s) were established, the T-AMF 205 also includes in the N2 message (or in any other message on the N2 interface between the T-AMF 205 and the T-RAN node 203) to the T-RAN node 203 two new parameters:

Original S-NSSAI—The T-AMF 205 places in this parameter the initial network slice from which the PDU Session was transferred to one of the alternative network slices in the last handover, e.g., S-NSSAI-3. This new parameter may be called 'original S-NSSAI', 'original network slice', 'initial network slice', 'initial S-NSSAI', 'UE requested S-NSSAI' or any other name or notation for a parameter with the purpose to carry information for the network slice(s) on which the PDU Session was established at the PDU Session Establishment procedure as described in 3GPP TS 23.502.

Alternative S-NSSAI—The T-AMF 205 places in this parameter one of the remaining alternative network slices received with the PDU Session Establishment Request message or the Service Request message from the UE 201, e.g., S-NSSAI-2. The alternative network slice can also be the default allowed S-NSSAI in the T-AMF 205 or UDM/UDR 206, if available.

The alternative S-NSSAI may also indicate alternative network slices that will be used for the PDU Session after the successful Handover procedure.

9) During the PDU Session Modification procedure, when the SMF sends the PDU Session Modification command to the UE 201 (within the N2 message on the T-AMF 205 to the T-RAN node interface) via the T-AMF 205 and the T-RAN node 203, the PDU Session Modification command includes a New S-NSSAI parameter (e.g., S-NSSAI-1) in order to let the UE 201 know that the S-NSSAI (e.g. S-NSSAI-3) being used for the PDU Session has been replaced with the New S-NSSAI (e.g. S-NSSAI-1). The T-RAN node 203 sends the PDU Session Modification command, received from the SMF via the T-AMF 205 (within the N2 message on the T-AMF 205 to the T-RAN node interface), to the UE 201. With this information, the UE 201 updates the network slice state in the UE 201. In one example, instead of sending the PDU Session Modification message to the UE 201, the T-AMF 205 may send the UE Configuration Update message to the UE 201 via the T-RAN node 203 to let the UE 201 know that the S-NSSAI (e.g., S-NSSAI-3) being used for the PDU Session has been replaced with the New S-NSSAI (e.g., S-NSSAI-1).

10) At some stage later again, a handover is required. When selecting a target cell and there are multiple qualifying cells, the T-RAN node 203 may select the target cell in the following order of preference:

- The 'original S-NSSAI'—the T-RAN node 203 may give a preference to the original network slice first (e.g., S-NSSAI-3) in selecting a target cell. This would allow for the PDU Session to be transferred back to the network slice on which the PDU Session has been established at the very beginning as this network slice may be the most suitable network slice for the PDU Sessions(s);
- The current network slice-if no target cell supports the original network slice (e.g., S-NSSAI-3), then the T-RAN node 203 may prefer to select a target cell supporting the current network slice on which the PDU Session(s) is currently active, e.g., S-NSSAI-1.
- The 'alternative S-NSSAI'-If there is no target cell supporting the original network slice nor the current network slice, then the T-RAN node 203 may prefer a target cell supporting the alternative network slice if available, e.g., S-NSSAI-2.

It should be noted that RAN node (both, S-RAN and T-RAN) may apply an alternative order(s) in selecting the target cell, for example first giving priority to a target cell supporting the current network slice with active PDU Session(s) on it (e.g., S-NSSAI-1) and then the original S-NSSAI (e.g., S-NSSAI-3) if available and last the alternative S-NSSAI (e.g., S-NSSAI-2), if available. The RAN node may apply a preference in any other order, e.g., an operator defined or configured order of preference between the original network slice, the current network slice and the alternative network slice.

Figure 4:
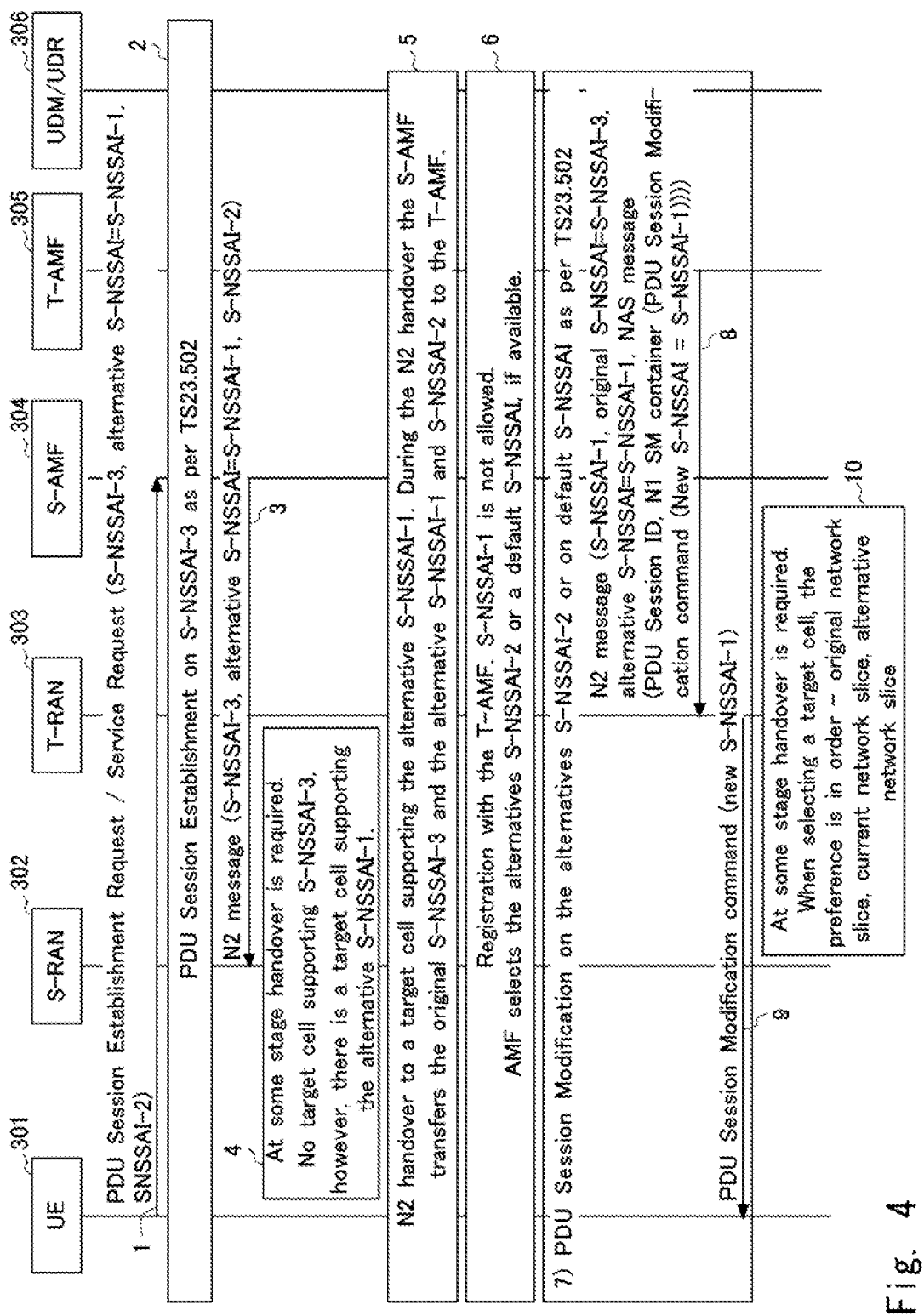
FIG. 4 is a schematic timing (signalling) diagram illustrating an exemplary method for UE assistance according to the first example aspect.

FIG. 4 is a schematic timing (signalling) diagram illustrating an exemplary method for UE assistance with alternative network slice(s) for PDU Session continuity in the N2 handover (Use case 2). In Use case 2 the alternative network slice in the target cell is not re-confirmed as an allowed network slice during the registration procedure in the T-AMF 305 after the N2 handover. In this case the T-AMF 305 may transfer the PDU Session(s) to another alternative S-NSSAI, if available (e.g., S-NSSAI-2) or to a default network slice in the new registration area.

1) PDU Session Establishment Request/Service Request (S-NSSAI-3, alternative S-NSSAI=S-NSSAI-1, S-NSSAI-2)—An Application in the UE 301 requires a service. The UE 301 checks with the NSSP (Network Slice Selection Policy) within the URSP (UE Route Selection Policy) rules in the UE Policy and finds out the network slice(s) on which the Application can receive a service, e.g., the S-NSSAI-3, S-NSSAI-1 and S-NSSAI-2. The UE 301 is registered to all these network slices. Based on the request from the Application, the UE 301 sends, to the S-AMF 304, a PDU Session Establishment Request message or Service Request message on the network slice S-NSSAI-3, for example. Along with the network slice S-NSSAI-3 inclusion in the PDU Session Establishment Request message or Service Request message (on which the PDU Session is to be established or reactivated), the UE 301 also includes in the PDU Session Establishment Request message or in the Service Request message a new parameter 'alternative S-NSSAI' in which the UE 301 places the network slice(s) that are also compatible with the service requiring Application in the UE 301, e.g., S-NSSAI-1 and S-NSSAI-2, if any.

The new parameter may be structured with priority order or preference order among alternative S-NSSAI(s). For example, if the "alternative S-NSSAI" parameter is set as the alternative S-NSSAI=S-NSSAI-1, S-NSSAI-2, this means that the UE 301 wishes to use the S-NSSAI-1 as an alternative S-NSSAI for the S-NSSAI-3 rather than the S-NSSAI-2. This new parameter may be called 'alternative S-NSSAI', 'alternative network slice', 'backup network slice', 'backup S-NSSAI' or any other name or notation for a parameter with the purpose to carry information for the network slice(s) that the service requiring Application in the UE 301 can work with based on the NSSP/URSP rules of the UE 301. The alternative network slice can also be the default allowed S-NSSAI in the UE 301, if available. The alternative network slice(s) can also be delivered by the UE 301 to the network via any other NAS message.

In one example, the S-AMF 304 may obtain alternative S-NSSAI(s) per S-NSSAI in the subscribed NSSAI during the Registration Procedure or during the Subscriber Data Update Notification to AMF procedure as described in 3GPP TS 23.502. In this case, the Nudm_SDM_Get service is used during the Registration Procedure and the Nudm_SDM_Notification service is used during the Subscriber Data Update Notification to AMF procedure.

In another example, the SMF may obtain alternative S-NSSAI(s) per S-NSSAI in the subscribed NSSAI during the Registration Procedure or during the Subscriber Data Update Notification to SMF procedure as described in 3GPP TS 23.502. In this case, the Nudm_SDM_Get service is used during the Registration Procedure and the Nudm_SDM_Notification service is used during the Subscriber Data Update Notification to AMF procedure.

2) PDU Session Establishment on the S-NSSAI-3 as per 3GPP TS 23.502.

3) N2 message (S-NSSAI-3, alternative S-NSSAI=S-NSSAI-1, S-NSSAI-2)—At the end of the PDU Session Establishment procedure on the network slice S-NSSAI-3, the S-AMF 304 sends, to the S-RAN node 302, the N2 message (or in any other message on the N2 interface between the S-AMF 304 and the S-RAN node 302), including a parameter for the current network slice on which the PDU Session was established (e.g. S-NSSAI-3), and also including the alternative network slice(s), if any, for example S-NSSAI-1 and S-NSSAI-2 within a new 'alternative S-NSSAI' parameter.

The new parameter may be structured with priority order or preference order among the alternative S-NSSAI(s). This new parameter in the N2 message may be called 'alternative S-NSSAI', 'alternative network slice', 'backup network slice', 'backup S-NSSAI' or any other name or notation for a parameter with the purpose to carry information for the network slice(s) that the service requiring Application in the UE 301 can work with. The alternative network slices S-NSSAI-1 and S-NSSAI-2, which the AMF 304 includes in the 'alternative S-NSSAI' parameter in the N2 message, are the ones which the AMF 304 has received from the UE 301 in the PDU Session Establishment Request message or in the Service Request message. The alternative network slice can also be the default allowed S-NSSAI in the S-AMF 304 or UDM/UDR 306, if available. When the S-AMF 304 sends the N2 message including alternative S-NSSAI(s) to the S-RAN node 302, the S-AMF 304 may confirm that the SMF(s) associated to the PDU session(s) are accessible from any alternative S-NSSAIs.

4) At some stage a handover is required. There is no target cell supporting the S-NSSAI-3 on which the UE 301 has an active PDU Session. However, there is a target cell supporting an alternative network slice, e.g., alternative S-NSSAI=S-NSSAI-1.

5) Handover to a target cell supporting the alternative network slice S-NSSAI-1. The S-RAN node 302 selects a target cell that supports one of the alternative network slices, e.g., alternative network slice S-NSSAI-1. If only the alternative network slice S-NSSAI-1 or the alternative network slice S-NSSAI-2 is available at any of the target cells, the priority among the alternative network slices should be considered at the S-RAN node 302 when selecting a target cell. If both alternative network slice S-NSSAI-1 and the alternative network slice S-NSSAI-2 are available at a target cell, the S-RAN node 302 selects the alternative network slice S-NSSAI-1 taking the priority into account. During the N2 handover the S-AMF 304 transfers the original S-NSSAI-3 and the alternative S-NSSAI-1 and S-NSSAI-2 to the T-AMF 305.

6) Registration with the T-AMF 305 as per 3GPP TS 23.502. The registration procedure does not re-confirm the S-NSSAI-1 as an allowed network slice.

7) PDU Session Modification on the alternative network slice S-NSSAI-2 or default S-NSSAI as per 3GPP TS 23.502—As the alternative network slice S-NSSAI-1 is not an allowed network slice in the new registration area, the T-AMF 305 triggers a PDU Session Modification procedure on another alternative network slice (e.g., S-NSSAI-2) or on a default network slice. As the S-NSSAI will be swapped during this procedure, the SMF may contact to the PCF and/or the CHF to issue separate CDRs, one with the original S-NSSAI-3 and the other one with the alternative network slice S-NSSAI-2 or the default network slice.

8) During the PDU Session Modification procedure, when the T-AMF 305 sends the N2 message to the T-RAN node 303, the N2 message contains the following parameters.

N2 message (S-NSSAI-2/default S-NSSAI, original S-NSSAI=S-NSSAI-3, alternative S-NSSAI=S-NSSAI-1, NAS message (PDU Session ID, N1 SM container (PDU Session Modification command (New S-NSSAI=S-NSSAI-1))))—During the PDU Session Modification on the network slice S-NSSAI-2/default S-NSSAI, the T-AMF 305 may send the N2 message to the T-RAN node 303. Along with the network slice on which the PDU Session(s) were established, the T-AMF 305 also includes in the N2 message (or in any other message on the N2 interface between the AMF 305 and the RAN node 303) to the T-RAN node 303 two new parameters:

Original S-NSSAI—The T-AMF 305 places in this parameter the initial network slice from which the PDU Session was transferred to one of the alternative network slices in the last handover, e.g., S-NSSAI-3. This new parameter may be called 'original S-NSSAI', 'original network slice', 'initial network slice', 'initial S-NSSAI', 'UE requested S-NSSAI' or any other name or notation for a parameter with the purpose to carry information for the network slice(s) on which the PDU Session was established at the PDU Session Establishment procedure as described in 3GPP TS 23.502.

Alternative S-NSSAI—The T-AMF 305 places in this parameter one of the remaining alternative network slices received with the PDU Session Establishment Request message or the Service Request message from the UE 301, (e.g., in this case S-NSSAI-1 that was rejected at the registration with the T-AMF 305 can still play the role of the alternative S-NSSAI). The alternative S-NSSAI may also indicate alternative network slices that will be used for the PDU Session after the successful Handover procedure.

9) During the PDU Session Modification procedure, when the SMF sends the PDU Session Modification command to the UE 301 via the T-AMF 305 (within the N2 message on the T-AMF 305 to the T-RAN node interface) and the T-RAN node 303, the PDU Session Modification command includes a New S-NSSAI parameter (e.g., S-NSSAI-2) in order to let the UE 301 knows that the S-NSSAI (e.g., S-NSSAI-3) being used for the PDU Session has been replaced with the New S-NSSAI (e.g., S-NSSAI-2). The T-RAN node 303 sends the PDU Session Modification command, received from the SMF via the T-AMF 305 (within the N2 message on the T-AMF 305 to the T-RAN node interface), to the UE 301. With this information, the UE 301 updates the network slice state in the UE 301.

In one example, instead of sending the PDU Session Modification message to the UE 301, the T-AMF 305 may send the UE Configuration Update message to the UE 301 via the T-RAN node 303 to let the UE 301 know that the S-NSSAI (e.g., S-NSSAI-3) being used for the PDU Session has been replaced with the New S-NSSAI (e.g., S-NSSAI-2).

10) At some stage later again a handover is required. When selecting a target cell and there are multiple qualifying cells, the T-RAN node 303 may select the target cell in the following order of preference:

The 'original S-NSSAI'—the T-RAN node 303 may give preference to the original network slice first (e.g., S-NSSAI-3) in selecting a target cell. This would allow for the PDU Session(s) to be transferred back to the network slice on which the PDU Session has been established at the very beginning as this network slice may be the most suitable network slice for the PDU Session(s).

The current network slice-if no target cell supports the original network slice (e.g., S-NSSAI-3), then the T-RAN node 303 may prefer to select a target cell supporting the current network slice on which the PDU Session(s) is currently active, e.g., S-NSSAI-2/default S-NSSAI.

The 'alternative S-NSSAI'-If there is no target cell supporting the original network slice nor the current network slice, then the T-RAN node 303 may prefer a target cell supporting the alternative network slice if available, e.g., S-NSSAI-1.

It should be noted that the RAN node (both, S-RAN node and T-RAN node) may apply an alternative order(s) in selecting the target cell, for example first giving priority to a target cell supporting the current network slice with active PDU Session(s) on it (e.g., S-NSSAI-2) and then the original S-NSSAI (e.g., S-NSSAI-3) if available and last the alternative S-NSSAI (e.g., S-NSSAI-1), if available. The RAN node may apply a preference in any other order, e.g., an operator defined or configured order of preference between the original network slice, the current network slice and the alternative network slice.

(Solution 2—Core Network Assistance with Alternative Network Slice for PDU Session Continuity)

Solution 2 proposes PDU Session transfer to an alternative network slice at a handover when the current network slice with active PDU Session(s) on the current network slice is not supported by the target cells. This allows for improved service continuity by transferring the active PDU Session(s) on the current network slice to an alternative network slice thus maintaining the service continuity, instead releasing the PDU Session(s). In this solution, the alternative network slices, for the PDU Session(s) that is being established, are provided by the network. The NSSP rules for the UE are retrieved by the AMF or the SMF from the URSP rules within the PCF during the PDU Session Establishment/Modification procedure. The AMF or the SMF finds out from the NSSP/URSP rules for the UE the alternative network slices (if any) that the current PDU Session is compatible with, e.g., the current PDU Session can be transferred to, if needed. Then the AMF or SMF provides these alternative network slices to the RAN node within the Core Network Assistance parameter in the N2 message or within a new parameter in the N2 message to assist a potential Xn and N2 handover.

Figure 5:
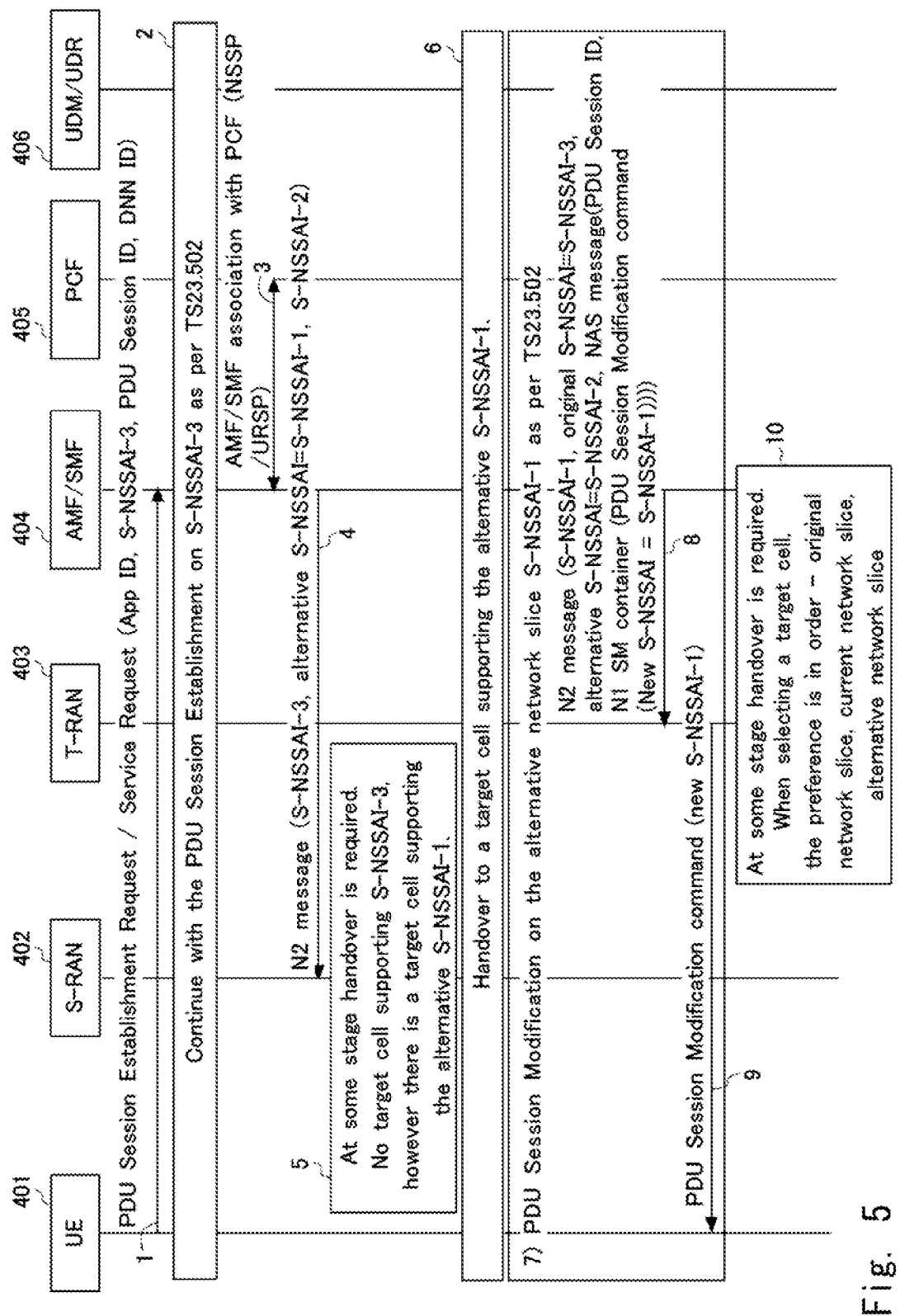
FIG. 5 is a schematic timing (signalling) diagram illustrating an exemplary method for Core Network assistance according to the first example aspect.

FIG. 5 is a schematic timing (signalling) diagram illustrating an exemplary method for Core Network assistance with alternative network slice for PDU Session continuity in the Xn handover.

1) PDU Session Establishment Request/Service Request (App ID, S-NSSAI-3, PDU Session ID, DNN ID)—An Application in the UE 401 requires a service. The UE 401 checks with the NSSP (Network Slice Selection Policy) within the URSP (UE Route Selection Policy) rules in the UE Policy and finds out the network slice(s) on which the Application can receive a service, e.g., the S-NSSAI-3, S-NSSAI-1 and S-NSSAI-2. The UE 401 is registered to all these network slices. Based on the request from the Application, the UE 401 sends, to the AMF 404, the PDU Session Establishment Request message or the Service Request message on the network slice S-NSSAI-3, for example. The UE 401 may also include in the Application identity e.g., App ID in the PDU Session Establishment Request or Service Request message as the App ID may assist the AMF 404 or the SMF 404 to find the alternative network slice(s) for network slice S-NSSAI-3 from the NSSP/URSP rules for the UE 401.

2) Continue with the PDU Session Establishment procedure or the Service Request procedure on the S-NSSAI-3 as per 3GPP TS 23.502.

3) AMF/SMF association with PCF (NSSP/URSP)—The AMF 404 or the SMF 404 may interact with the PCF 405 during the association with the PCF 405 in order to discover the compatible network slices for the network slice S-NSSAI-3 on which a PDU Session is being established.

The AMF 404, during the UE Policy Association Establishment with the PCF 405, may either:
  a) request the URSP or NSSP rules for the UE 401 from the PCF 405 via the Npcf_UEPolicy_Contol_Create Request message. In this case, the AMF 404 would include a new parameter (e.g., URSP flag, NSSP flag or any other name for a parameter with the purpose of requesting URSP or NSSP information from the PCF 405) in the Npcf_UEPolicy_Contol_Create Request message; OR
  b) request the list of the network slices that are compatible with the current network slice S-NSSAI-3 via the Npcf_UEPolicy_Contol_Create Request message. In this case, the AMF 404 may include, in the Npcf_UEPolicy_Contol_Create Request message, the identity of the Application (e.g., App ID) that has triggered the PDU Session Establishment, the network slice identity (e.g., S-NSSAI-3) on which the PDU Session is being established or the DNN ID in order to facilitate the PCF 405 in finding the network slices compatible to the network slice S-NSSAI-3.

The PCF 405 may provide the requested information (i.e., the URSP or NSSP rules for the UE) or the list of the network slices compatible with the network slice S-NSSAI-3 with the Npcf_UEPolict_Control_Create Response message.

It should be noted that the AMF 404 may make use of any other existing procedure or service provided by the PCF 405 in order to retrieve the URSP or NSSP related information from the PCF 405.

The SMF 404, during the SM Policy Association Establishment or SM Policy Association Modification with the PCF 405, may either:
  a) request the URSP or the NSSP rules for the UE 401 from the PCF 405 via the Npcf_SMPolicy_Contol_Create Request message. In this case, the SMF 404 would include a new parameter (e.g., URSP flag or NSSP flag or any other name for a parameter with the purpose of requesting URSP or NSSP information from the PCF 405) in the Npcf_SMPolicy_Contol_Create Request message; OR
  b) request the list of the network slices that are compatible with the current network slice S-NSSAI-3 via the Npcf_SMPolicy_Contol_Create Request message. In this case, the SMF 404 may include, in the Npcf_SMPolicy_Contol_Create Request message, the identity of the Application (e.g., App ID) that has triggered the PDU Session Establishment, the network slice identity (e.g., S-NSSAI-3) on which the PDU Session is being established or the DNN ID in order to facilitate the PCF 405 in finding the network slices compatible to the network slice S-NSSAI-3.

The PCF 405 may provide the requested information (i.e., the URSP or NSSP rules for the UE 401) or the list of the network slices compatible with the S-NSSAI-3 with the Npcf_SMPolicy_Control_Create Response message.

It should be noted that the SMF 404 may make use of any other existing procedure or service provided by the PCF 405 in order to retrieve the URSP or NSSP related information from the PCF 405.

4) N2 message (S-NSSAI-3, alternative S-NSSAI=S-NSSAI-1, S-NSSAI-2)—At the end of the PDU Session Establishment procedure on the network slice S-NSSAI-3, the AMF 404 sends, to the S-RAN node 402, the N2 message (or in any other message on the N2 interface between the AMF 404 and the RAN node), including a parameter for the current network slice on which the PDU Session was established (e.g. S-NSSAI-3), and also including the alternative network slice(s) retrieved from the PCF 405 directly or first retrieving the URSP or NSSP rules for the UE 401 as described in step 3 (for example S-NSSAI-1 and S-NSSAI-2) within a new 'alternative S-NSSAI' parameter.

The new parameter may be structured with priority order or preference order among alternative S-NSSAI(s). This new parameter in the N2 message may be called 'alternative S-NSSAI', 'alternative network slice', 'backup network slice', 'backup S-NSSAI' or any other name or notation for a parameter with the purpose to carry information for the network slice(s) that the service requiring Application in the UE 401 can work with. The alternative network slice can also be the default allowed S-NSSAI in the AMF 404 or UDM/UDR 406, if available.

When the AMF 404 sends the N2 message including alternative S-NSSAI(s) to the S-RAN node 402, the AMF 404 may confirm that the SMF(s) 404 associated to the PDU session(s) are accessible from any alternative S-NSSAIs.

5) At some stage a handover is required. There is no target cell supporting the S-NSSAI-3 on which the UE 401 has an active PDU Session. However, there is a target cell supporting an alternative network slice, e.g., alternative S-NSSAI=S-NSSAI-1.

6) Handover to a target cell supporting the alternative network slice S-NSSAI-1. The S-RAN node 402 selects a target cell that supports one of the alternative network slices, e.g. alternative network slice S-NSSAI-1. If only the alternative network slice S-NSSAI-1 or the alternative network slice S-NSSAI-2 is available at any of the target cells, the priority among the alternative network slices should be considered at the S-RAN node 402 when selecting a target cell. If both alternative network slice S-NSSAI-1 and the alternative network slice S-NSSAI-2 are available at a target cell, the S-RAN node 402 selects the alternative network slice S-NSSAI-1 taking the priority into account.

7) PDU Session Modification on the alternative network slice S-NSSAI-1 as per 3GPP TS 23.502—The AMF 404 triggers PDU Session Modification on the alternative network slice S-NSSAI-1. As the S-NSSAI will be swapped during this procedure, the SMF 404 may contact the PCF 405 and/or the CHF (Charging Function) to issue separate CDRs, one with the original S-NSSAI-3 and the other one with the alternative network slice S-NSSAI-1.

8) During the PDU Session Modification procedure, when the AMF 404 sends the N2 message to the T-RAN node 403, the N2 message contains the following parameters.

N2 message (S-NSSAI-1, original S-NSSAI=S-NSSAI-3, alternative S-NSSAI=S-NSSAI-2, NAS message (PDU Session ID, N1 SM container (PDU Session Modification command (New S-NSSAI=S-NSSAI-1))))—At the end of the PDU Session Modification on the network slice S-NSSAI-1, the AMF 404 may send the N2 message to the T-RAN node 403. Along with the network slice on which the PDU Session(s) were established, the AMF 404 also includes in the N2 message (or in any other message on the N2 interface between the AMF 404 and the RAN node 403) two new parameters:

Original S-NSSAI—The AMF 404 places in this parameter the initial network slice from which the PDU Session was transferred to one of the alternative network slices in the last handover, e.g., S-NSSAI-3. This new parameter may be called 'original S-NSSAI', 'original network slice', 'initial network slice', 'initial S-NSSAI', 'UE requested S-NSSAI' or any other name or notation for a parameter with the purpose to carry information for the network slice(s) on which the PDU Session was established at the PDU Session Establishment procedure as described in 3GPP TS 23.502.

Alternative S-NSSAI—The AMF 404 places in this parameter one of the remaining alternative network slices, e.g., S-NSSAI-2. The alternative network slice can also be the default allowed S-NSSAI in the AMF 404 or UDM/UDR 406, if available. The alternative S-NSSAI may also indicate alternative network slices that will be used for the PDU Session after the successful Handover procedure.

9) During the PDU Session Modification procedure, when the SMF 404 sends the PDU Session Modification command to the UE 401 via the AMF 404 (within the N2 message on the AMF 404 to the T-RAN node interface) and the T-RAN node 403, the PDU Session Modification command includes a New S-NSSAI parameter (e.g., S-NSSAI-1) in order to let the UE 401 know that the S-NSSAI (e.g. S-NSSAI-3) being used for the PDU Session has been replaced with the New S-NSSAI (e.g. S-NSSAI-1). The T-RAN node 403 sends the PDU Session Modification command, received from the SMF 404 via the AMF 404 (within the N2 message on the AMF 404 to the T-RAN node interface), to the UE 401. With this information, the UE 401 updates the network slice state in the UE 401.

In one example, instead of sending the PDU Session Modification message to the UE 401, the AMF 404 may send the UE Configuration Update message to the UE 401 via the T-RAN node 403 to let the UE 401 know that the S-NSSAI (e.g., S-NSSAI-3) being used for the PDU Session has been replaced with the New S-NSSAI (e.g., S-NSSAI-1).

10) At some stage later again a handover is required. When selecting a target cell and there are multiple qualifying cells, the T-RAN node 403 may select the target cell in the following order of preference:

The 'original S-NSSAI'—the T-RAN node 403 may give preference to the original network slice first (e.g., S-NSSAI-3) in selecting a target cell. This would allow for the PDU Session(s) to be transferred back to the network slice on which the PDU Session has been established at the very beginning as this network slice may be the most suitable network slice for that PDU Session(s);

The current network slice-if no target cell supports the original network slice (e.g., S-NSSAI-3), then the T-RAN node 403 may prefer to select a target cell supporting the current network slice on which the PDU Session is currently active, e.g., S-NSSAI-1.

The 'alternative S-NSSAI'-If there is no target cell supporting the original network slice nor the current network slice, then the T-RAN node 403 may prefer a target cell supporting the alternative network slice if available, e.g., S-NSSAI-2.

It should be noted that the (source/target) RAN node may apply an alternative order(s) of preference in selecting the target cell, for example first giving priority to a target cell supporting the current network slice with active PDU Session on it (e.g., S-NSSAI-1) and then the original S-NSSAI (e.g., S-NSSAI-3) if available and last the alternative S-NSSAI (e.g., S-NSSAI-2) if available. The (source/target) RAN node may apply a preference in any other order, e.g., an operator defined or configured order of preference between the original network slice, the current network slice and the alternative network slice.

Figure 6:
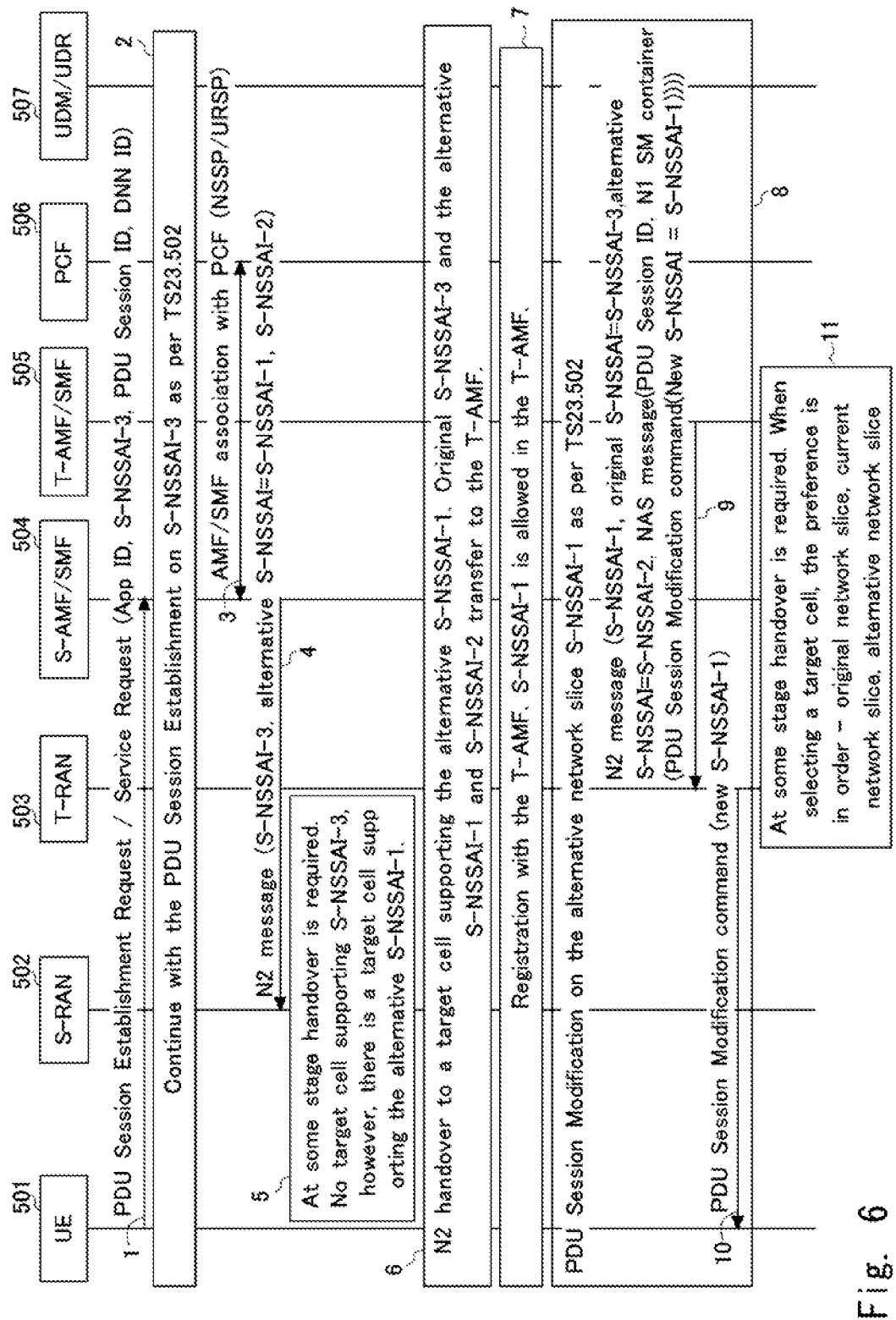
FIG. 6 is a schematic timing (signalling) diagram illustrating an exemplary method for Core Network assistance according to the first example aspect.

FIG. 6 is a schematic timing (signalling) diagram illustrating an exemplary method for Core Network assistance with alternative network slice for PDU Session continuity in the N2 handover (Use case 1). In Use case 1 the alternative network slice in the target cell is re-confirmed as allowed network slice during the registration procedure in the T-AMF after the N2 handover.

1) PDU Session Establishment Request/Service Request (App ID, S-NSSAI-3, PDU Session ID, DNN ID)—An Application in the UE 501 requires a service. The UE 501 checks with the NSSP (Network Slice Selection Policy) within the URSP (UE Route Selection Policy) rules in the UE Policy and finds out the network slice(s) on which that Application can receive a service, e.g., the S-NSSAI-3, S-NSSAI-1 and S-NSSAI-2. The UE 501 is registered to all these network slices. Based on the request from the Application, the UE sends, to the source AMF (S-AMF) 504, a PDU Session Establishment Request message or Service Request message on network slice S-NSSAI-3, for example. The UE 501 may also include the Application identity e.g., App ID in the PDU Session Establishment Request or Service Request message as the App ID may assist the AMF 504 or the SMF 504 to find the alternative network slice(s) for the network slice S-NSSAI-3 from the NSSP/URSP rules for the UE 501.

2) Continue with the PDU Session Establishment procedure or the Service Request procedure on the S-NSSAI-3 as per 3GPP TS 23.502.

3) AMF/SMF association with the PCF 506 (NSSP/URSP)—The S-AMF 504 or the SMF 504 may interact with the PCF 506 during the association with the PCF 506 in order to discover the compatible network slices for the network slice S-NSSAI-3 on which a PDU Session is being established.

The S-AMF 504, during the UE Policy Association Establishment with the PCF 506, may either:
  a) request the URSP or NSSP rules for the UE 501 from the PCF 506 via the Npcf_UEPolicy_Contol_Create Request message. In this case, the S-AMF 504 would include a new parameter (e.g., URSP flag, NSSP flag or any other name for a parameter with the purpose of requesting URSP or NSSP information from the PCF 506) in the Npcf_UEPolicy_Contol_Create Request message; OR
  b) request the list of the network slices that are compatible with the current network slice S-NSSAI-3 via the Npcf_UEPolicy_Contol_Create Request message. In this case, the S-AMF 504 may include, in the Npcf_UEPolicy_Contol_Create Request message, the identity of the Application (e.g., App ID) that has triggered the PDU Session Establishment, the network slice identity (e.g., S-NSSAI-3) on which the PDU Session is being established or the DNN ID in order to facilitate the PCF 506 in finding the network slices compatible to the network slice S-NSSAI-3.

The PCF 506 may provide the requested information (i.e., the URSP or NSSP rules for the UE 501) or the list of the network slices compatible with the S-NSSAI-3 with the Npcf_UEPolict_Control_Create Response message.

It should be noted that the S-AMF 504 may make use of any other existing procedure or service provided by the PCF 506 in order to retrieve the URSP or NSSP related information from the PCF 506.

The SMF 504, during the SM Policy Association Establishment or SM Policy Association Modification with the PCF 506, may either:
  a) request the URSP or NSSP rules for the UE 501 from the PCF 506 via the Npcf_SMPolicy_Contol_Create Request message. In this case, the SMF 504 would include a new parameter (e.g., URSP flag or NSSP flag or any other name for a parameter with the purpose of requesting URSP or NSSP information from the PCF 506) in the Npcf_SMPolicy_Contol_Create Request message; OR
  b) request the list of the network slices that are compatible with the current network slice S-NSSAI-3 via the Npcf_SMPolicy_Contol_Create Request message. In this case, the SMF 504 may include, in the Npcf_SMPolicy_Contol_Create Request message, the identity of the Application (e.g., App ID) that has triggered the PDU Session Establishment, the network slice identity (e.g., S-NSSAI-3) on which the PDU Session is being established or the DNN ID in order to facilitate the PCF 506 in finding the network slices compatible to the network slice S-NSSAI-3.

The PCF 506 may provide the requested information (i.e., the URSP or NSSP rules for the UE 501) or the list of the network slices compatible with the S-NSSAI-3 with the Npcf_SMPolicy_Control_Create Response message.

It should be noted that the SMF 504 may make use of any other existing procedure or service provided by the PCF 506 in order to retrieve the URSP or NSSP related information from the PCF 506.

4) N2 message (S-NSSAI-3, alternative S-NSSAI=S-NSSAI-1, S-NSSAI-2)—At the end of the PDU Session Establishment procedure on the network slice S-NSSAI-3, the S-AMF 504 sends, to the RAN node, the N2 message (or in any other message on the N2 interface between the AMF 504 and the RAN node), including a parameter for the current network slice on which the PDU Session was established (e.g. S-NSSAI-3), and also including the alternative network slice(s) retrieved from the PCF 506 directly or first retrieving the URSP or NSSP rules for the UE 501 as described in step 3 (for example S-NSSAI-1 and S-NSSAI-2) within a new 'alternative S-NSSAI' parameter.

The new parameter may be structured with priority order or preference order among the alternative S-NSSAI(s). This new parameter in the N2 message may be called 'alternative S-NSSAI', 'alternative network slice', 'backup network slice', 'backup S-NSSAI' or any other name or notation for a parameter with the purpose to carry information for the network slice(s) that the service requiring Application in the UE 501 can work with. The alternative network slice can also be the default allowed S-NSSAI in the S-AMF 504 or UDM/UDR 507, if available.

When the S-AMF 504 sends the N2 message including alternative S-NSSAI(s) to the S-RAN node 502, the S-AMF 504 may confirm that the SMF(s) 504 associated to the PDU session(s) are accessible from any alternative S-NSSAIs.

5) At some stage a handover is required. There is no target cell supporting the S-NSSAI-3 on which the UE 501 has an active PDU Session. However, there is a target cell supporting an alternative network slice, e.g., alternative S-NSSAI=S-NSSAI-1.

6) Handover to a target cell supporting the alternative network slice S-NSSAI-1. The S-RAN node 502 selects a target cell that supports one of the alternative network slices, e.g., alternative network slice S-NSSAI-1. If only the alternative network slice S-NSSAI-1 or the alternative network slice S-NSSAI-2 is available at any of the target cells, the priority among the alternative network slices should be considered at the S-RAN node 502 when selecting a target cell. If both alternative network slice S-NSSAI-1 and the alternative network slice S-NSSAI-2 are available at a target cell, the S-RAN node 502 selects the alternative network slice S-NSSAI-1 taking the priority into account. During the N2 handover the S-AMF 504 transfers the original S-NSSAI-3 and the alternative S-NSSAI-1 and S-NSSAI-2 to the T-AMF 505.

7) Registration with the T-AMF 505 as per 3GPP TS 23.502. The registration procedure re-confirms the S-NSSAI-1 as an allowed network slice.

8) PDU Session Modification procedure to replace the current S-NSSAI, i.e., S-NSSAI-3, with the alternative network slice S-NSSAI-1 as per 3GPP TS 23.502

The T-AMF 505 triggers PDU Session Modification on the alternative network slice S-NSSAI-1. As the S-NSSAI will be swapped during this procedure, the SMF 505 may contact the PCF 506 and/or the CHF to issue separate CDRs, one with the original S-NSSAI-3 and the other one with the alternative network slice S-NSSAI-1.

9) During the PDU Session Modification procedure, when the T-AMF 505 sends the N2 message to the T-RAN node 503, the N2 message contains the following parameters.

N2 message (S-NSSAI-1, original S-NSSAI=S-NSSAI-3, alternative S-NSSAI=S-NSSAI-2, NAS message (PDU Session ID, N1 SM container (PDU Session Modification command (New S-NSSAI=S-NSSAI-1))))—During the PDU Session Modification on the alternative network slice S-NSSAI-1, the T-AMF 505 may send the N2 message to the T-RAN node 503. Along with the network slice on which the PDU Session(s) were established, the T-AMF 505 also includes in the N2 message (or in any other message on the N2 interface between the T-AMF 505 and the T-RAN node 503) to the T-RAN node 503 two new parameters:

- Original S-NSSAI—The T-AMF 505 places in this parameter the initial network slice from which the PDU Session was transferred to one of the alternative network slices in the last handover, e.g., S-NSSAI-3. This new parameter may be called 'original S-NSSAI', 'original network slice', 'initial network slice', 'initial S-NSSAI', 'UE requested S-NSSAI' or any other name or notation for a parameter with the purpose to carry information for the network slice(s) on which the PDU Session was established at the PDU Session Establishment procedure as described in 3GPP TS 23.502.
- Alternative S-NSSAI—The T-AMF 505 places in this parameter one of the remaining alternative network slices e.g., S-NSSAI-2. The alternative network slice can also be the default allowed S-NSSAI in the T-AMF 505 or UDM/UDR 507, if available. The alternative S-NSSAI may also indicate alternative network slices that will be used for the PDU Session after the successful Handover procedure.

10) During the PDU Session Modification procedure, when the SMF 505 sends the PDU Session Modification command to the UE 501 via the T-AMF 505 (within the N2 message on the T-AMF 505 to the T-RAN node interface) and the T-RAN node 503, the PDU Session Modification command includes a New S-NSSAI parameter (e.g., S-NSSAI-1) in order to let the UE 501 know that the S-NSSAI (e.g. S-NSSAI-3) being used for the PDU Session has been replaced with the New S-NSSAI (e.g. S-NSSAI-1). The T-RAN node 503 sends the PDU Session Modification command, received from the SMF 505 via the T-AMF 505 (within the N2 message on the T-AMF 505 to the T-RAN node interface), to the UE 501. With this information, the UE 501 updates the network slice state in the UE.

In one example, instead of sending the PDU Session Modification message to the UE 501, the T-AMF 505 may send the UE Configuration Update message to the UE 501 via the T-RAN node 503 to let the UE 501 know that the S-NSSAI (e.g., S-NSSAI-3) being used for the PDU Session has been replaced with the New S-NSSAI (e.g., S-NSSAI-1).

11) At some stage later again a handover is required. When selecting a target cell and there are multiple qualifying cells, the T-RAN node 503 may select the target cell in the following order of preference:

- The 'original S-NSSAI'—the T-RAN node 503 may give preference to the original network slice first (e.g., S-NSSAI-3) in selecting a target cell. This would allow for the PDU Session to be transferred back to the network slice on which the PDU Session has been established at the very beginning as this network slice may be the most suitable network slice for that PDU Session(s);
- The current network slice-if no target cell supports the original network slice (e.g., S-NSSAI-3), then the T-RAN node 503 may prefer to select a target cell supporting the current network slice on which the PDU Session is currently active, e.g., S-NSSAI-1.
- The 'alternative S-NSSAI'-If there is no target cell supporting the original network slice nor the current network slice, then the T-RAN node 503 may prefer a target cell supporting the alternative network slice if available, e.g., S-NSSAI-2.

It should be noted that RAN node (both, S-RAN and T-RAN) may apply an alternative order(s) in selecting the target cell, for example first giving priority to a target cell supporting the current network slice with active PDU Session on it (e.g., S-NSSAI-1) and then the original S-NSSAI (e.g., S-NSSAI-3) if available and last the alternative S-NSSAI (e.g., S-NSSAI-2), if available. The RAN node may apply a preference in any other order, e.g., an operator defined or configured order of preference between the original network slice, the current network slice and the alternative network slice.

Figure 7:
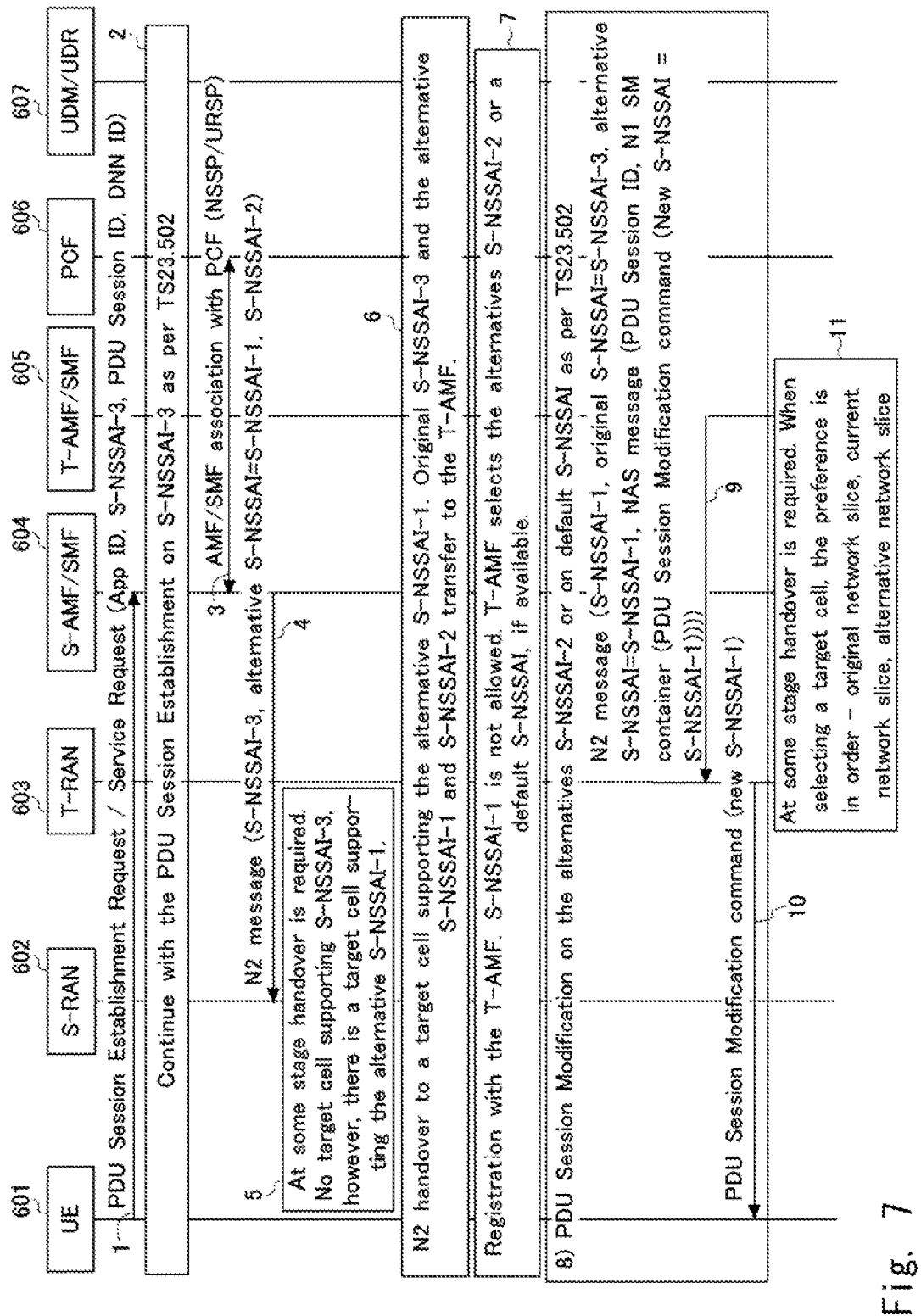
FIG. 7 is a schematic timing (signalling) diagram illustrating an exemplary method for Core Network assistance according to the first example aspect.

FIG. 7 is a schematic timing (signalling) diagram illustrating an exemplary method for Core Network assistance with alternative network slice for PDU Session continuity in the N2 handover (Use case 2). In Use case 2 the alternative network slice in the target cell is not re-confirmed as allowed network slice during the registration procedure in the T-AMF after the N2 handover. In this case the T-AMF may transfer the PDU Session to another alternative S-NSSAI, if available (e.g., S-NSSAI-2) or to a default network slice in the new registration area.

1) PDU Session Establishment Request/Service Request (App ID, S-NSSAI-3, PDU Session ID, DNN ID)—An Application in the UE 601 requires a service. The UE 601 checks with the NSSP (Network Slice Selection Policy) within the URSP (UE Route Selection Policy) rules in the UE Policy and finds out the network slice(s) on which the Application can receive a service, e.g., the S-NSSAI-3, S-NSSAI-1 and S-NSSAI-2. The UE 601 is registered to all these network slices. Based on the request from the Application, the UE 601 sends, to the S-AMF 604, a PDU Session Establishment Request message or Service Request message on the network slice S-NSSAI-3, for example. The UE 601 may also include the Application identity e.g., App ID in the PDU Session Establishment Request or Service Request message as the App ID may assist the S-AMF 604 or the SMF 604 to find the alternative network slice(s) for network slice S-NSSAI-3 from the NSSP/URSP rules for the UE 601.

2) Continue with the PDU Session Establishment procedure or the Service Request procedure on the S-NSSAI-3 as per 3GPP TS 23.502.

3) AMF/SMF association with the PCF 606 (NSSP/URSP)—The S-AMF 604 or the SMF 604 may interact with the PCF 606 during the association with PCF in order to discover the compatible network slices for the network slice S-NSSAI-3 on which a PDU Session is being established.

The S-AMF 604, during the UE Policy Association Establishment with the PCF 606, may either:

a) request the URSP or NSSP rules for the UE 601 from the PCF 606 via the Npcf_UEPolicy_Contol_Create Request message. In this case, the S-AMF 604 would include a new parameter (e.g., URSP flag, NSSP flag or any other name for a parameter with the purpose of requesting URSP or NSSP information from the PCF 606) in the Npcf_UEPolicy_Contol_Create Request message; OR b) request the list of the network slices that are compatible with the current network slice S-NSSAI-3 via the Npcf_UEPolicy_Contol_Create Request message. In this case, the S-AMF 604 may include, in the Npcf_UEPolicy_Contol_Create Request message, the identity of the Application (e.g., App ID) that has triggered the PDU Session Establishment, the network slice identity (e.g., S-NSSAI-3) on which the PDU Session is being established or the DNN ID in order to facilitate the PCF 606 in finding the network slices compatible to the network slice S-NSSAI-3.

The PCF 606 may provide the requested information (i.e., the URSP or NSSP rules for the UE 601) or the list of the network slices compatible with the S-NSSAI-3 with the Npcf_UEPolict_Control_Create Response message.

It should be noted that the S-AMF 604 may make use of any other existing procedure or service provided by the PCF 606 in order to retrieve the URSP or NSSP related information from the PCF 606.

The SMF 604, during the SM Policy Association Establishment or SM Policy Association Modification with the PCF 606, may either:

a) request the URSP or NSSP rules for the UE 601 from the PCF 606 via the Npcf_SMPolicy_Contol_Create Request message. In this case, the SMF 604 would include a new parameter (e.g., URSP flag or NSSP flag or any other name for a parameter with the purpose of requesting URSP or NSSP information from the PCF 606) in the Npcf_SMPolicy_Contol_Create Request message; OR b) request the list of the network slices that are compatible with the current network slice S-NSSAI-3 via the Npcf_SMPolicy_Contol_Create Request message. In this case, the SMF 604 may include, in the Npcf_SMPolicy_Contol_Create Request message, the identity of the Application (e.g., App ID) that has triggered the PDU Session Establishment, the network slice identity (e.g., S-NSSAI-3) on which the PDU Session is being established or the DNN ID in order to facilitate the PCF 606 in finding the network slices compatible to the network slice S-NSSAI-3.

The PCF 606 may provide the requested information (i.e., the URSP or NSSP rules for the UE 601) or the list of the network slices compatible with the S-NSSAI-3 with the Npcf_SMPolicy_Control_Create Response message.

It should be noted that the SMF 604 may make use of any other existing procedure or service provided by the PCF 606 in order to retrieve the URSP or NSSP related information from the PCF 606.

4) N2 message (S-NSSAI-3, alternative S-NSSAI=S-NSSAI-1, S-NSSAI-2)—At the end of the PDU Session Establishment procedure on the network slice S-NSSAI-3, the S-AMF 604 sends, to the S-RAN node 602, the N2 message (or in any other message on the N2 interface between the S-AMF 604 and the S-RAN node 602), including a parameter for the current network slice on which the PDU Session was established (e.g. S-NSSAI-3), and also including the alternative network slice(s) retrieved from the PCF 606 directly or first retrieving the URSP or NSSP rules for the UE 601 as described in step 3 (for example S-NSSAI-1 and S-NSSAI-2) within a new 'alternative S-NSSAI' parameter.

The new parameter may be structured with priority order or preference order among the alternative S-NSSAI(s). This new parameter in the N2 message may be called 'alternative S-NSSAI', 'alternative network slice', 'backup network slice', 'backup S-NSSAI' or any other name or notation for a parameter with the purpose to carry information for the network slice(s) that the service requiring Application in the UE 601 can work with. The alternative network slice can also be the default allowed S-NSSAI in the S-AMF 604 or UDM/UDR 607, if available.

When the S-AMF 604 sends the N2 message including alternative S-NSSAI(s) to the S-RAN node 602, the S-AMF 604 may confirm that the SMF(s) 604 associated to the PDU session(s) are accessible from any alternative S-NSSAIs.

5) At some stage a handover is required. There is no target cell supporting the S-NSSAI-3 on which the UE 601 has an active PDU Session. However, there is a target cell supporting an alternative network slice, e.g., alternative S-NSSAI=S-NSSAI-1.

6) Handover to a target cell supporting the alternative network slice S-NSSAI-1. The S-RAN node 602 selects a target cell that supports one of the alternative network slices, e.g., alternative network slice S-NSSAI-1. If only the alternative network slice S-NSSAI-1 or the alternative network slice S-NSSAI-2 is available at any of the target cells, the priority among the alternative network slices should be considered at the S-RAN node 602 when selecting a target cell. If both alternative network slice S-NSSAI-1 and the alternative network slice S-NSSAI-2 are available at a target cell, the S-RAN node 602 selects the alternative network slice S-NSSAI-1 taking the priority into account. During the N2 handover the S-AMF 604 transfers the original S-NSSAI-3 and the alternative S-NSSAI-1 and S-NSSAI-2 to the T-AMF 605.

7) Registration with the T-AMF 605 as per 3GPP TS 23.502. The registration procedure does not re-confirm the S-NSSAI-1 as an allowed network slice. 8) PDU Session Modification on the alternative network slice S-NSSAI-2 or default S-NSSAI as per 3GPP TS 23.502—As the alternative network slice S-NSSAI-1 is not allowed network slice in the new registration area, the T-AMF 605 triggers a PDU Session Modification procedure on another alternative network slice (e.g., S-NSSAI-2) or on a default network slice. As the S-NSSAI will be swapped during this procedure, the SMF 605 may contact to the PCF 606 and/or the CHF to issue separate CDRs, one with the original S-NSSAI-3 and the other one with the alternative network slice S-NSSAI-2 or the default network slice.

9) During the PDU Session Modification procedure, when the T-AMF 605 sends the N2 message to the T-RAN node 603, the N2 message contains the following parameters.

N2 message (S-NSSAI-2/default S-NSSAI, original S-NSSAI=S-NSSAI-3, alternative S-NSSAI=S-NSSAI-1, NAS message (PDU Session ID, N1 SM container (PDU Session Modification command (New S-NSSAI=S-NSSAI-1))))—During the PDU Session Modification on the network slice S-NSSAI-2/default S-NSSAI, the T-AMF 605 may send the N2 message to the T-RAN node 603. Along with the network slice on which the PDU Session(s) were established, the T-AMF 605 also includes in the N2 message (or in any other message on the N2 interface between the AMF 605 and the RAN node) to the T-RAN node two new parameters:

Original S-NSSAI—The T-AMF 605 places in this parameter the initial network slice from which the PDU Session was transferred to one of the alternative network slices in the last handover, e.g., S-NSSAI-3. This new parameter may be called 'original S-NSSAI', 'original network slice', 'initial network slice', 'initial S-NSSAI', 'UE requested S-NSSAI' or any other name or notation for a parameter with the purpose to carry information for the network slice(s) on which the PDU Session was established at the PDU Session Establishment procedure as described in 3GPP TS 23.502.

Alternative S-NSSAI—The T-AMF 605 places in this parameter one of the remaining alternative network slices, e.g., in this case S-NSSAI-1 that was rejected at the registration with the T-AMF 605 can still play the role of the alternative S-NSSAI. The alternative S-NSSAI may also indicate alternative network slices that will be used for the PDU Session after the successful Handover procedure.

10) During the PDU Session Modification procedure, when the SMF 605 sends the PDU Session Modification command to the UE 601 via the T-AMF 605 (within the N2 message on the T-AMF 605 to the T-RAN node interface) and the T-RAN node 603, the PDU Session Modification command includes a New S-NSSAI parameter (e.g., S-NSSAI-2) in order to let the UE 601 know that the S-NSSAI (e.g. S-NSSAI-3) being used for the PDU Session has been replaced with the New S-NSSAI (e.g. S-NSSAI-2). The T-RAN node 603 sends the PDU Session Modification command, received from the SMF 605 via the T-AMF 605 (within the N2 message on the T-AMF 605 to the T-RAN node interface), to the UE 601. With this information, the UE 601 updates the network slice state in the UE 601.

In one example, instead of sending the PDU Session Modification message to the UE 601, the T-AMF 605 may send the UE Configuration Update message to the UE 601 via the T-RAN node 603 to let the UE 601 know that the S-NSSAI (e.g., S-NSSAI-3) being used for the PDU Session has been replaced with the New S-NSSAI (e.g., S-NSSAI-2).

11) At some stage later again a handover is required. When selecting a target cell and there are multiple qualifying cells, the T-RAN node 603 may select the target cell in the following order of preference:

- The 'original S-NSSAI'—the T-RAN node 603 may give preference to the original network slice first (e.g., S-NSSAI-3) in selecting a target cell. This would allow for the PDU Session to be transferred back to the network slice it has been established on at the very beginning as this network slice may be the most suitable network slice for that PDU Session(s);
- The current network slice-if no target cell supports the original network slice (e.g., S-NSSAI-3), then the T-RAN node 603 may prefer to select a target cell supporting the current network slice on which the PDU Session is currently active, e.g., NSSAI-2/default S-NSSAI.
- The 'alternative S-NSSAI'-if there is no target cell supporting the original network slice nor the current network slice, then the T-RAN node 603 may prefer a target cell supporting the alternative network slice if available, e.g., S-NSSAI-1.

It should be noted that RAN node (both, S-RAN and T-RAN) may apply an alternative order(s) in selecting the target cell, for example first giving priority to a target cell supporting the current network slice with active PDU Session on it (e.g., S-NSSAI-2) and then the original S-NSSAI (e.g., S-NSSAI-3) if available and last the alternative S-NSSAI (e.g., S-NSSAI-1), if available. The RAN node may apply a preference in any other order, e.g., an operator defined or configured order of preference between the original network slice, the current network slice and the alternative network slice.

Beneficially, the above described aspects include, although they are not limited to, one or more of the following functionalities:

- A new 'alternative network slice' parameter in the PDU Session Establishment Request and Service Request messages from the UE.
- A new 'alternative network slice' and 'original network slice' parameters in the N2 message from the AMF to the RAN node.
- The 'alternative network slice' and the 'original network slice' parameters transfer between source and target AMFs in the N2 handover.
- NSSP (Network Slice Selection Policy) or alternative network slices retrieval from the PCF by the AMF/SMF.

In order to provide these functionalities, the above aspects describe exemplary methods comprising (at least some of) the following steps:

- Service continuity improvement via PDU Session transfer/mapping across network slices in a handover based on the 'alternative network slice' provided by the UE.
- Service continuity improvement via PDU Session transfer/mapping across network slices in a handover based on the 'alternative network slice' provided by the network (e.g., PCF).
- Service continuity improvement via PDU Session transfer/mapping across network slices in a handover based on the 'original network slice' maintained by the AMF.

The present disclosure proposes methods for service continuity for mobile terminals in connected mode. These methods allow for PDU Session transfer to an alternative network slice when the current network slice with PDU Session on it is not available in the target cell after a handover. Thus, the service continuity is maintained by PDU Sessions transfer on alternative network slices.

(System Overview)

Figure 8:
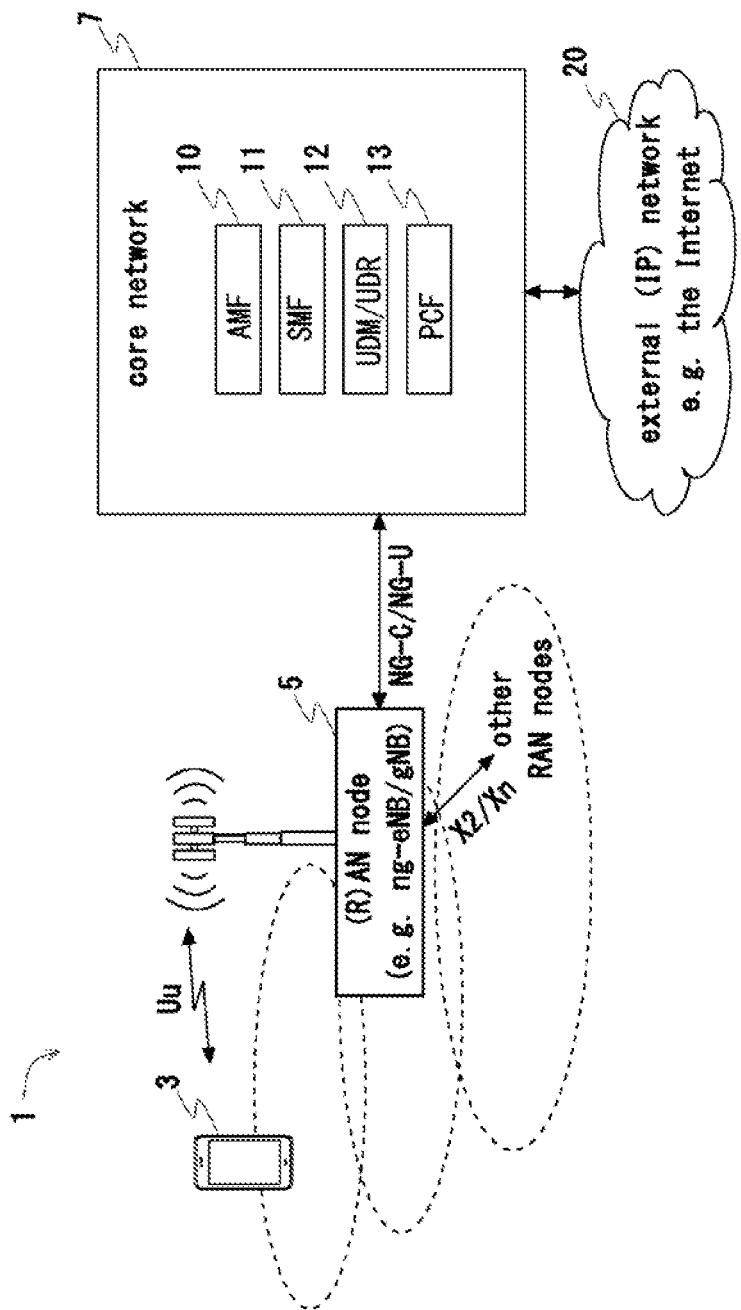
FIG. 8 is a figure illustrating a mobile (cellular or wireless) telecommunication system according to the first example aspect.

FIG. 8 schematically illustrates a mobile (cellular or wireless) telecommunication system 1 to which the above aspects are applicable.

In this network, users of mobile devices 3 (UEs) can communicate with each other and other users via respective base stations 5 and a core network 7 using an appropriate 3GPP radio access technology (RAT), for example, an E-UTRA and/or 5G RAT. It will be appreciated that a number of base stations 5 form a (radio) access network or (R)AN. As those skilled in the art will appreciate, whilst one mobile device 3 and one base station 5 (RAN) are shown in FIG. 8 for illustration purposes, the system, when implemented, will typically include other base stations and mobile devices (UEs).

Each base station 5 controls one or more associated cells (either directly or via other nodes such as home base stations, relays, remote radio heads, distributed units, and/or the like). A base station 5 that supports E-UTRA protocols to the mobile devices 3 may be referred to as an 'ng-eNB' and a base station 5 that supports Next Generation protocols to the mobile devices 3 may be referred to as a 'gNB'. It will be appreciated that some base stations 5 may be configured to support both 4G and 5G, and/or any other 3GPP or non-3GPP communication protocols.

The mobile device 3 and its serving base station 5 are connected via an appropriate air interface (for example the so-called 'Uu' interface and/or the like). Neighbouring base stations 5 are connected to each other via an appropriate base station to base station interface (such as the so-called 'X2' interface, 'Xn' interface and/or the like). The base station 5/access network is also connected to the core network nodes via an appropriate interface (such as the so-called 'NG-U' interface (for user-plane), the so-called 'NG-C' interface (for control-plane), and/or the like).

The core network 7 typically includes logical nodes (or 'functions') for supporting communication in the telecommunication system 1. Typically, for example, the core network 7 of a 'Next Generation'/5G system will include, amongst other functions, control plane functions (CPFs) and user plane functions (UPFs). It will be appreciated that the core network 7 may also include, amongst others: an Access and Mobility Management Function (AMF) 10, a Session Management Function (SMF) 11, a Unified Data Management (UDM)/Unified Data Repository (UDR) function 12, and a Policy Control Function (PCF) 13. Although not shown in FIG. 8, the core network 7 may also be coupled to at least one application function (AF)/application server (AS), and/or the like. From the core network 7, connection to an external IP network/data network 20 (such as the Internet) is also provided.

The components of this system 1 are configured to perform one or more of the above-described aspects.

(User Equipment (UE))

Figure 9:
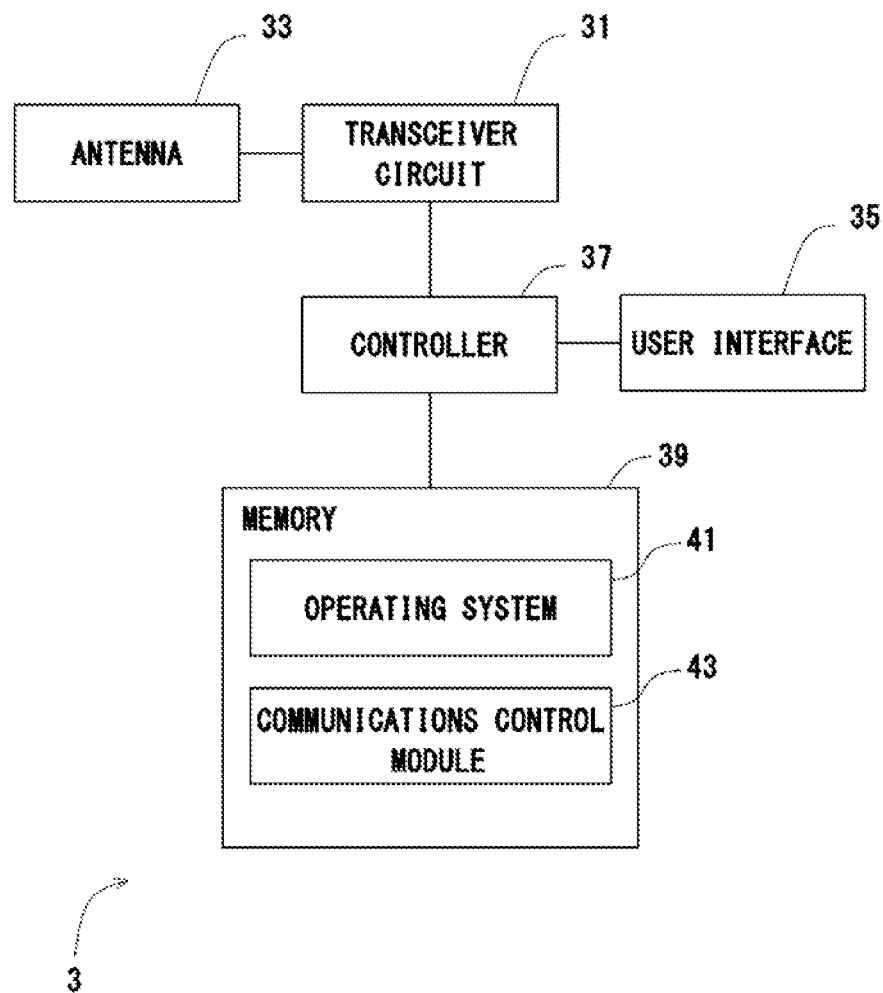
FIG. 9 is a block diagram illustrating the main components of the UE (mobile device) shown in FIG. 8 according to the first example aspect.

FIG. 9 is a block diagram illustrating the main components of the UE (mobile device 3) shown in FIG. 8. As shown, the UE includes a transceiver circuit 31 which is operable to transmit signals to and to receive signals from the connected node(s) via one or more antenna 33. Although not necessarily shown in FIG. 9, the UE will of course have all the usual functionality of a conventional mobile device (such as a user interface 35) and this may be provided by any one or any combination of hardware, software and firmware, as appropriate. A controller 37 controls the operation of the UE in accordance with software stored in a memory 39. The software may be pre-installed in the memory 39 and/or may be downloaded via the telecommunication system 1 or from a removable data storage device (RMD), for example. The software includes, among other things, an operating system 41 and a communications control module 43. The communications control module 43 is responsible for handling (generating/sending/receiving) signalling messages and uplink/downlink data packets between the UE 3 and other nodes, including (R)AN nodes 5, application functions, and core network nodes. Such signaling includes appropriately formatted requests and responses relating to management of network slices and handover.

((R)AN Node)

Figure 10:
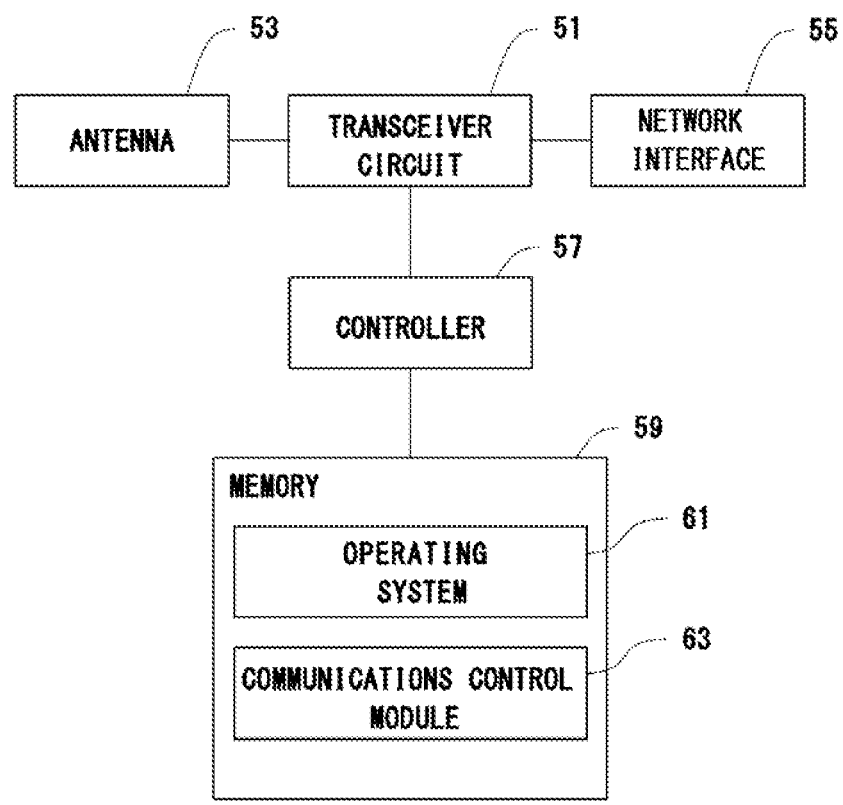
FIG. 10 is a block diagram illustrating the main components of an exemplary (R)AN node (base station) shown in FIG. 8 according to the first example aspect.

FIG. 10 is a block diagram illustrating the main components of an exemplary (R)AN node 5 (base station) shown in FIG. 8. As shown, the (R)AN node 5 includes a transceiver circuit 51 which is operable to transmit signals to and to receive signals from connected UE(s) 3 via one or more antenna 53 and to transmit signals to and to receive signals from other network nodes (either directly or indirectly) via a network interface 55. The network interface 55 typically includes an appropriate base station-base station interface (such as X2/Xn) and an appropriate base station-core network interface (such as NG-U/NG-C). A controller 57 controls the operation of the (R)AN node 5 in accordance with software stored in a memory 59. The software may be pre-installed in the memory 59 and/or may be downloaded via the telecommunication system 1 or from a removable data storage device (RMD), for example. The software includes, among other things, an operating system 61 and a communications control module 63. The communications control module 63 is responsible for handling (generating/sending/receiving) signalling between the (R)AN node 5 and other nodes, such as the UE 3, and the core network nodes. Such signaling includes appropriately formatted requests and responses relating to management of network slices and handover.

(Core Network Node)

Figure 11:
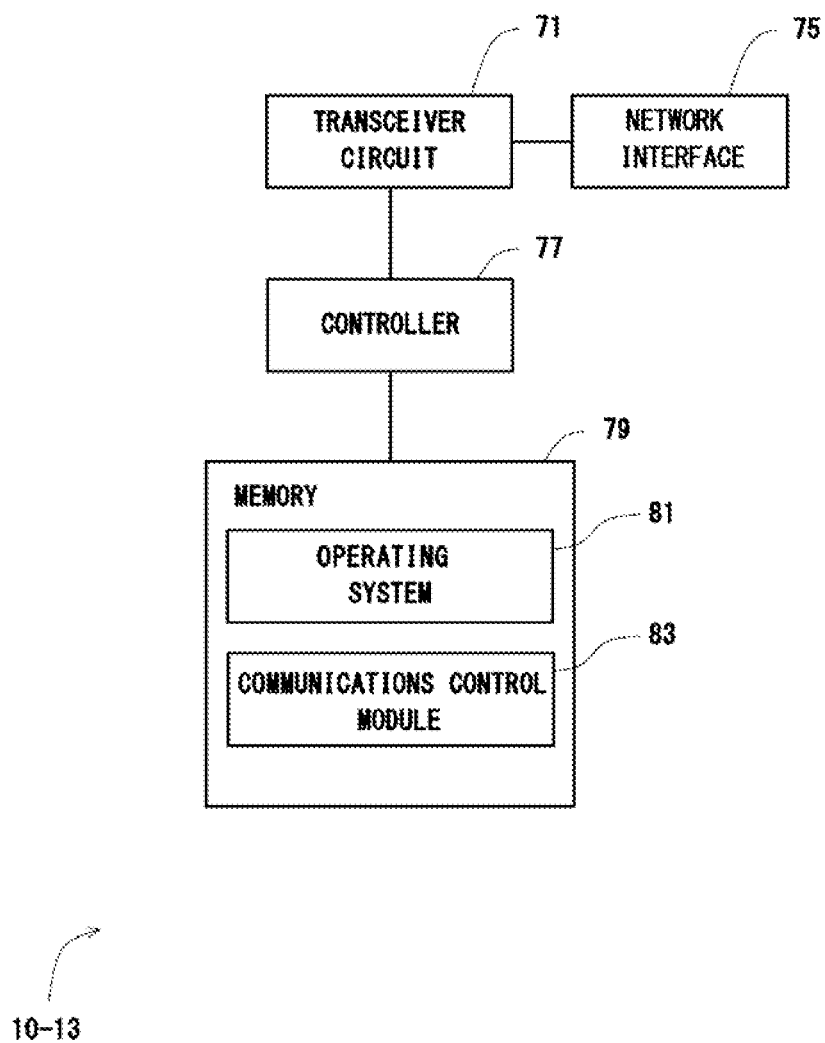
FIG. 11 is a block diagram illustrating the main components of a generic core network node (or function) shown in FIG. 8 according to the first example aspect.

FIG. 11 is a block diagram illustrating the main components of a generic core network node (or function) shown in FIG. 8, for example, the AMF 10, the SMF 11, the UDM/UDR 12, and the PCF 13. As shown, the core network node includes a transceiver circuit 71 which is operable to transmit signals to and to receive signals from other nodes (including the UE 3 and the (R)AN node 5) via a network interface 75. A controller 77 controls the operation of the core network node in accordance with software stored in a memory 79. The software may be pre-installed in the memory 79 and/or may be downloaded via the telecommunication system 1 or from a removable data storage device (RMD), for example. The software includes, among other things, an operating system 81 and at least a communications control module 83. The communications control module 83 is responsible for handling (generating/sending/receiving) signaling between the core network node and other nodes, such as the UE 3, (R)AN node 5, and other core network nodes. Such signaling includes appropriately formatted requests and responses relating to management of network slices and handover.

(Modifications and Alternatives)

Detailed aspects have been described above. As those skilled in the art will appreciate, a number of modifications and alternatives can be made to the above aspects whilst still benefiting from the inventions embodied therein. By way of illustration only a number of these alternatives and modifications will now be described.

In the above description, the UE, the (R)AN node, and the core network node are described for ease of understanding as having a number of discrete modules (such as the communication control modules). Whilst these modules may be provided in this way for certain applications, for example where an existing system has been modified to implement the above aspects, in other applications, for example in systems designed with the inventive features in mind from the outset, these modules may be built into the overall operating system or code and so these modules may not be discernible as discrete entities. These modules may also be implemented in software, hardware, firmware or a mix of these.

Each controller may comprise any suitable form of processing circuitry including (but not limited to), for example: one or more hardware implemented computer processors; microprocessors: central processing units (CPUs); arithmetic logic units (ALUs); input/output (IO) circuits; internal memories/caches (program and/or data); processing registers; communication buses (e.g. control, data and/or address buses); direct memory access (DMA) functions; hardware or software implemented counters, pointers and/or timers; and/or the like.

The memories shown above may be formed by a volatile memory or a nonvolatile memory, however, the memories may be formed by a combination of a volatile memory and a nonvolatile memory.

In the above aspects, a number of software modules were described. As those skilled in the art will appreciate, the software modules may be provided in compiled or un-compiled form and may be supplied to the UE, the (R)AN node, and the core network node as a signal over a computer network, or on a recording medium. Further, the functionality performed by part or all of this software may be performed using one or more dedicated hardware circuits.

However, the use of software modules is preferred as it facilitates the updating of the UE, the (R)AN node, and the core network node in order to update their functionalities.

The above aspects are also applicable to 'non-mobile' or generally stationary user equipment.

Various other modifications will be apparent to those skilled in the art and will not be described in further detail here.

Part of or all the foregoing aspects can be described as in the following appendixes, but the present disclosure is not limited thereto.

(Supplementary Note 1)

An access network node, comprising:
means for receiving, from a network function node for mobility management, at least one first network slice information, each of which is different from a second network slice information being used for a Protocol Data Unit, PDU, session with a user equipment, UE; and
means for performing a redirection procedure for the UE from a first cell to a second cell which supports one of the at least one first network slice information in a case where the second network slice information is not available in the first cell.

(Supplementary Note 2)

The access network node according to Supplementary Note 1, wherein the one of the at least one first network slice information is allowed after a registration procedure of the UE.

(Supplementary Note 3)

The access network node according to Supplementary Note 1 or 2, wherein the one of the at least one first network slice information is determined based on a priority among the at least one first network slice.

(Supplementary Note 4)

The access network node according to any one of Supplementary Notes 1 to 3, wherein
the means for performing is configured to perform the redirection procedure for the UE from the first cell to the second cell during the handover from the access network node serving the first cell to another access network node serving the second cell.

(Supplementary Note 5)

The access network node according to any one of Supplementary Notes 1 to 4, wherein
the at least one network slice information and the second network slice information are transmitted by a PDU session establishment request or a service request message, from the UE to the network function node for mobility management.

(Supplementary Note 6)

The access network node according to any one of Supplementary Notes 1 to 4, wherein
the at least one network slice information is selected, by the network function node for mobility management, by retrieving from a network function node for policy control using an application identity, and
the application identity is transmitted by a PDU session establishment request or a service request message, from the UE to the network function node for mobility management.

(Supplementary Note 7)

The access network node according to any one of Supplementary Notes 1 to 5, wherein
re-establishment of the PDU session from a second network slice indicated by the second network slice information to a first network slice indicated by the one of the at least one first network slice information is performed after the redirection procedure.

(Supplementary Note 8)

A user equipment, UE, comprising:
means for transmitting, to a network function node for mobility management via an access network node, at least one network slice information and second network slice information in a Protocol Data Unit, PDU, session establishment request or a service request message, wherein
the second network slice information is used for a PDU session with the network function node for mobility management,
each of the at least one first network slice information is different from the second network slice information, and
a redirection procedure for the UE from a first cell served by the access network node to a second cell which supports one of the at least one first network slice information is performed in a case where the second network slice information is not available in the first cell.

(Supplementary Note 9)

A user equipment, UE, comprising:
means for transmitting, to a network function node for mobility management via an access network node, an application identity and second network slice information in a Protocol Data Unit, PDU, session establishment request or a service request message, wherein
the second network slice information is used for a PDU session with the network function node for mobility management,
the application identity is used by the network function node for mobility management for retrieving at least one first network slice information, each of which is different from the second network slice information, and
a redirection procedure for the UE from a first cell served by the access network node to a second cell which supports one of the at least one first network slice information is performed in a case where the second network slice information is not available in the first cell.

(Supplementary Note 10)

A network function node for mobility management, comprising:
means for sending, to an access network node, at least one first network slice information, each of which is different from a second network slice information being used for a PDU session with a user equipment, UE, wherein
the at least one first network slice information is used, by the access network node, for performing a redirection procedure for the UE from a first cell to a second cell which supports one of the at least one first network slice information in a case where the second network slice information is not available in the first cell.

(Supplementary Note 11)

A control method for an access network node, comprising:
receiving, from a network function node for mobility management, at least one first network slice information, each of which is different from a second network slice information being used for a Protocol Data Unit, PDU, session with a user equipment, UE; and
performing a redirection procedure for the UE from a first cell to a second cell which supports one of the at least one first network slice information in a case where the second network slice information is not available in the first cell.

(Supplementary Note 12)
The control method according to Supplementary Note 11, wherein the one of the at least one first network slice information is allowed after a registration procedure of the UE.

(Supplementary Note 13)
The control method according to Supplementary Note 11 or 12, wherein the one of the at least one first network slice information is determined based on a priority among the at least one first network slice.

(Supplementary Note 14)
The control method according to any one of Supplementary Notes 11 to 13, wherein
the performing includes performing the redirection procedure for the UE from the first cell to the second cell during the handover from the access network node serving the first cell to another access network node serving the second cell.

(Supplementary Note 15)
The control method according to any one of Supplementary Notes 11 to 14, wherein
the at least one network slice information and the second network slice information are transmitted by a PDU session establishment request or a service request message, from the UE to the network function node for mobility management.

(Supplementary Note 16)
The control method according to any one of Supplementary Notes 11 to 14, wherein
the at least one network slice information is selected, by the network function node for mobility management, by retrieving from a network function node for policy control using an application identity, and
the application identity is transmitted by a PDU session establishment request or a service request message, from the UE to the network function node for mobility management.

(Supplementary Note 17)
The control method according to any one of Supplementary Notes 11 to 15, wherein
re-establishment of the PDU session from a second network slice indicated by the second network slice information to a first network slice indicated by the one of the at least one first network slice information is performed after the redirection procedure.

(Supplementary Note 18)
A control method for a user equipment, UE, comprising:
transmitting, to a network function node for mobility management via an access network node, at least one network slice information and second network slice information in a Protocol Data Unit, PDU, session establishment request or a service request message, wherein
the second network slice information is used for a PDU session with the network function node for mobility management,
each of the at least one first network slice information is different from the second network slice information, and
a redirection procedure for the UE from a first cell served by the access network node to a second cell which supports one of the at least one first network slice information is performed in a case where the second network slice information is not available in the first cell.

(Supplementary Note 19)
A control method for a user equipment, UE, comprising:
transmitting, to a network function node for mobility management via an access network node, an application identity and second network slice information in a Protocol Data Unit, PDU, session establishment request or a service request message, wherein
the second network slice information is used for a PDU session with the network function node for mobility management,
the application identity is used by the network function node for mobility management for retrieving at least one first network slice information, each of which is different from the second network slice information, and
a redirection procedure for the UE from a first cell served by the access network node to a second cell which supports one of the at least one first network slice information is performed in a case where the second network slice information is not available in the first cell.

(Supplementary Note 20)
A control method for a network function node for mobility management, comprising:
sending, to an access network node, at least one first network slice information, each of which is different from a second network slice information being used for a PDU session with a user equipment, UE, wherein
the at least one first network slice information is used, by the access network node, for performing a redirection procedure for the UE from a first cell to a second cell which supports one of the at least one first network slice information in a case where the second network slice information is not available in the first cell.

It will be appreciated by a person skilled in the art that numerous variations and/or modifications may be made to the present disclosure as shown in the specific aspects without departing from the spirit or scope of this disclosure as broadly described. The present aspects are, therefore, to be considered in all respects to be illustrative and not restrictive.

This application is based upon and claims the benefit of priority from European patent application No. EP20189550.5, filed on Aug. 5, 2020, the disclosures of which are incorporated herein in its entirety by reference.

REFERENCE SIGNS LIST

101 UE
102 S-RAN node
103 T-RAN node
104 AMF/SMF
105 UDM/UDR
201 UE
202 S-RAN node
203 T-RAN node
204 S-AMF
205 T-AMF
206 UDM/UDR
301 UE
302 S-RAN node
303 T-RAN node
304 S-AMF
305 T-AMF 306 UDM/UDR
401 UE
402 S-RAN node
403 T-RAN node
404 AMF/SMF
405 PCF
406 UDM/UDR
501 UE
502 S-RAN node
503 T-RAN node
504 S-AMF/SMF
505 T-AMF/SMF
506 PCF
507 UDM/UDR
601 UE
602 S-RAN node
603 T-RAN node
604 S-AMF/SMF
605 T-AMF/SMF
606 PCF
607 UDM/UDR
1 telecommunication system
3 mobile device
5 base station
7 core network
10 AMF
11 SMF
12 UDM/UDR
13 PCF
20 external IP network/data network
31 transceiver circuit
33 antenna
35 user interface
37 controller
39 memory
41 operating system
43 communications control module
51 transceiver circuit
53 antenna
55 network interface
57 controller
59 memory
61 operating system
63 communications control module
71 transceiver circuit
75 network interface
77 controller
79 memory
81 operating system
83 communications control module
91 access network node
911 receiving unit
912 performing unit
93 user equipment
931 transmitting unit
95 network function node
951 sending unit

What is claimed is:

1. A User equipment (UE) comprising:
one or more memories storing instructions; and
one or more processors configured to process the instructions to control the UE to:
  transmit, to an Access and Mobility Management Function (AMF), a first message comprising both a Single-Network Slice Selection Assistance Information (S-NSSAI) for a Protocol Data Unit (PDU) session and an Alternative S-NSSAI for the PDU session; and
  receive, from the AMF, a second message comprising the Alternative S-NSSAI for the PDU session based on a determination to replace the S-NSSAI for the PDU session with the Alternative S-NSSAI for the PDU session, the determination being performed by the AMF based on the first message.

2. A method performed by a User equipment (UE), the method comprising:
  transmitting, to an Access and Mobility Management Function (AMF), a first message comprising both a Single-Network Slice Selection Assistance Information (S-NSSAI) for a Protocol Data Unit (PDU) session and an Alternative S-NSSAI for the PDU session; and
  receiving, from the AMF, a second message comprising the Alternative S-NSSAI for the PDU session based on a determination to replace the S-NSSAI for the PDU session with the Alternative S-NSSAI for the PDU session, the determination being performed by the AMF based on the first message.

3. The method according to claim 2, wherein the first message comprises a PDU session establishment request message.

4. The method according to claim 2, wherein the method further comprises:
  transmitting, to the AMF, the first message comprising the S-NSSAI for the PDU session, and
  receiving, from the AMF, a third message to perform a UE configuration update procedure to reconfigure the UE with the Alternative S-NSSAI for the PDU session based on a determination to replace the S-NSSAI for the PDU session with the Alternative S-NSSAI for the PDU session, the determination being performed by the AMF based on the first message.

5. The method according to claim 2, wherein the S-NSSAI comprises a plurality of S-NSSAIs, and
  wherein the Alternative S-NSSAI comprises a plurality of Alternative S-NSSAIs.

6. An Access and Mobility Management Function (AMF) comprising:
one or more memories storing instructions; and
one or more processors configured to process the instructions to control the AMF to:
  receive, from a User Equipment (UE), a first message comprising both a Single-Network Slice Selection Assistance Information (S-NSSAI) for a Protocol Data Unit (PDU) session and an Alternative S-NSSAI for the PDU session; and
  transmit, to the UE, a second message comprising the Alternative S-NSSAI for the PDU session based on a determination to replace the S-NSSAI for the PDU session with the Alternative S-NSSAI for the PDU session, the determination being performed based on the first message comprising.

7. A method performed by an Access and Mobility Management Function (AMF), the method comprising:
  receiving, from a User Equipment (UE), a first message comprising both a Single-Network Slice Selection Assistance Information (S-NSSAI) for a Protocol Data Unit (PDU) session and an Alternative S-NSSAI for the PDU session; and
  transmitting, to the UE, a second message comprising the Alternative S-NSSAI for the PDU session based on a determination to replace the S-NSSAI for the PDU session with the Alternative S-NSSAI for the PDU session, the determination being performed based on the first message.

8. The method according to claim 7, wherein the first message comprises a PDU session establishment request message.

9. The method according to claim 7, wherein the method further comprises:
   determining to replace the S-NSSAI for the PDU session with the Alternative S-NSSAI for the PDU session based on the Alternative S-NSSAI for the PDU session, the Alternative S-NSSAI being received from a Policy Control Function (PCF).

10. The method according to claim 7, wherein the method further comprises:
    receiving, from the UE, the first message comprising the S-NSSAI for the PDU session; and
    transmitting, to the UE, a third message to perform a UE configuration update procedure to reconfigure the UE with the Alternative S-NSSAI for the PDU session based on a determination to replace the S-NSSAI for the PDU session with the Alternative S-NSSAI for the PDU session, the determination being performed based on the first message.

11. The method according to claim 7, wherein the S-NSSAI comprises a plurality of S-NSSAIs, and
    wherein the Alternative S-NSSAI comprises a plurality of Alternative S-NSSAIs.

* * * * *